(12) United States Patent
Nielsen et al.

(10) Patent No.: US 11,425,502 B2
(45) Date of Patent: Aug. 23, 2022

(54) DETECTION OF MICROPHONE ORIENTATION AND LOCATION FOR DIRECTIONAL AUDIO PICKUP

(71) Applicant: Cisco Technology, Inc., San Jose, CA (US)

(72) Inventors: Johan Ludvig Nielsen, Sør-Fron (NO); Håvard Kjellmo Arnestad, Ski (NO); David Alejandro Rivas Méndez, Fornebu (NO); Jochen C. Schirdewahn, Stabekk (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 14 days.

(21) Appl. No.: 17/025,117

(22) Filed: Sep. 18, 2020

(65) Prior Publication Data
US 2022/0095052 A1    Mar. 24, 2022

(51) Int. Cl.
| | |
|---|---|
| H04R 5/00 | (2006.01) |
| H04R 5/027 | (2006.01) |
| H04N 7/15 | (2006.01) |
| H04R 1/40 | (2006.01) |

(52) U.S. Cl.
CPC ............. *H04R 5/027* (2013.01); *H04N 7/15* (2013.01); *H04R 1/406* (2013.01); *H04R 2201/40* (2013.01)

(58) Field of Classification Search
CPC ....................................................... H04R 5/00
See application file for complete search history.

(56) References Cited

U.S. PATENT DOCUMENTS

| | | |
|---|---|---|
| 7,154,526 B2 | 12/2006 | Foote et al. |
| 7,586,513 B2 | 9/2009 | Muren et al. |
| 8,509,454 B2 | 8/2013 | Kirkeby et al. |
| 8,537,195 B2 | 9/2013 | Duckworth et al. |

(Continued)

FOREIGN PATENT DOCUMENTS

WO    2017143910 A1    8/2017

OTHER PUBLICATIONS

Plantronics, Inc., "3D VOICE", https://www.poly.com/us/en/innovations/3d-voice, downloaded Sep. 10, 2020, 2 pages.

(Continued)

*Primary Examiner* — Olisa Anwah
(74) *Attorney, Agent, or Firm* — Edell, Shapiro & Finnan, LLC

(57) ABSTRACT

Methods and a system that automatically determines the spatial relationship of microphone assemblies with respect to a camera of a video conference endpoint through audio signal processing. The video conference endpoint may include at least a microphone assembly and a loudspeaker. The microphone assembly may include a plurality of co-located directional microphones. The video conference endpoint may detect, by the plurality of co-located directional microphones of the microphone assembly, audio emitted from the loudspeaker of the video conference endpoint. The video conference endpoint may then generate data representing a spatial relationship of the microphone assembly with respect to the loudspeaker based on a compilation of the audio detected by the co-located directional microphones of the microphone assembly.

20 Claims, 17 Drawing Sheets

(56) References Cited

U.S. PATENT DOCUMENTS

| | | | |
|---|---|---|---|
| 8,797,376 | B2 | 8/2014 | Saleh et al. |
| 8,842,161 | B2 | 9/2014 | Feng et al. |
| 9,215,543 | B2 | 12/2015 | Sun et al. |
| 9,491,405 | B2 | 11/2016 | Zhou |
| 9,554,091 | B1 | 1/2017 | Malegaonkar et al. |
| 9,674,453 | B1 | 6/2017 | Tangeland et al. |
| 9,723,260 | B2 | 8/2017 | Feng |
| 9,942,513 | B1 | 4/2018 | Aarrestad et al. |
| 9,980,040 | B2 | 5/2018 | Whyte et al. |
| 10,122,972 | B2 | 11/2018 | Feng |
| 10,362,270 | B2 | 7/2019 | Goesnar et al. |
| 10,440,322 | B2 | 10/2019 | Aarrestad et al. |
| 10,516,852 | B2 | 12/2019 | Theien et al. |
| 10,598,543 | B1 | 3/2020 | Mansour et al. |
| 11,012,481 | B2 * | 5/2021 | Gopal ............... H04L 65/1083 |
| 11,143,739 | B2 * | 10/2021 | Janssen ............... H04R 1/08 |
| 2004/0114772 | A1 | 6/2004 | Zlotnick |
| 2010/0328419 | A1 | 12/2010 | Etter |
| 2014/0240447 | A1 | 8/2014 | Cartwright et al. |
| 2015/0221319 | A1 | 8/2015 | Cartwright et al. |
| 2015/0243200 | A1 | 8/2015 | Pan |
| 2015/0271593 | A1 | 9/2015 | Sun et al. |
| 2015/0288824 | A1 | 10/2015 | Quiers |
| 2016/0065828 | A1 | 3/2016 | Lee |
| 2017/0150099 | A1 | 5/2017 | Duckworth et al. |
| 2017/0280265 | A1 * | 9/2017 | Po ............... H04R 3/04 |
| 2019/0369951 | A1 | 12/2019 | Reiger et al. |
| 2020/0408906 | A1 * | 12/2020 | Schediwy ............... G01S 15/588 |

OTHER PUBLICATIONS

De Bruijn, "Application of Wave Field Synthesis in Videoconferencing," TU Delft, Delft University of Technology, Oct. 2004, 272 pages.

Eskow, "The Art of Audio Mixing for Sports," http://www.tvtechnology.com/news/0002/the-art-of-audio-mixing-for-sports/277456, Nov. 18, 2015, 3 pages.

Herre, et al., "MPEG-H Audio—The New Standard for Universal Spatial/3D Audio Coding," Journal of the Audio Engineering Society, vol. 62, No. 12, Dec. 2014, 12 pages.

N. Matsuo, et al., "Speaker Position Detection System Using Audio-visual Information", UDC 621.397.3:801.41, Fujitsu Sci. Tech. J., 35, 2, pp. 212-220, Dec. 1999, 9 pages.

"RealPresence Group Series", Group Video Conference—Polycom RealPresence Group Conferencing, Polycom, Inc., http://www.polycom.co.in/products-services/hd-telepresence-video-conferencing/realpresence-room/realpresence-group-series.html, downloaded from the internet on Jul. 19, 2016, 16 pages.

Trond F. Bergh, "Speaker Tracking Based on Face Detection and Voice Activity Detection Using a Microphone Array", 2 pages.

* cited by examiner

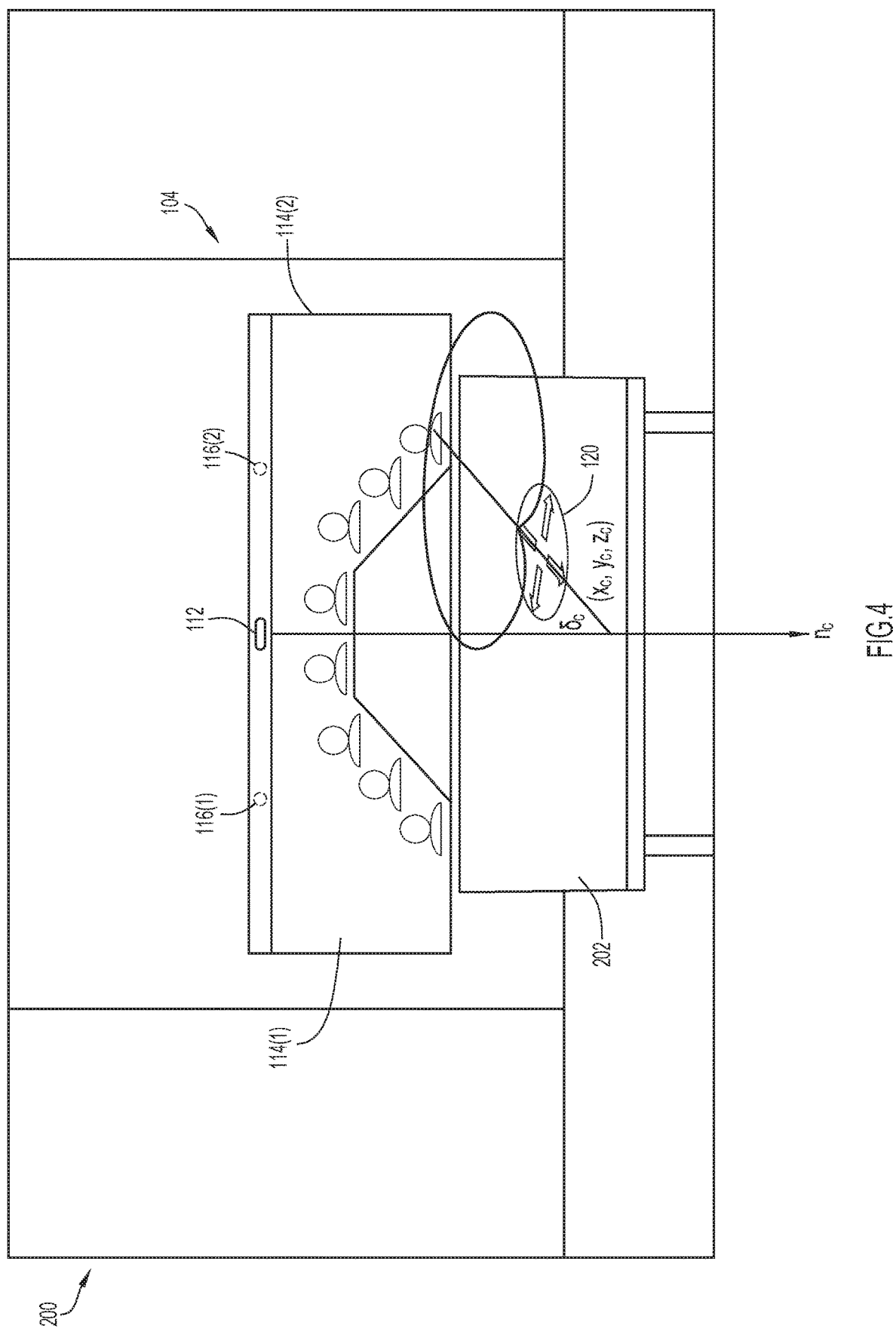

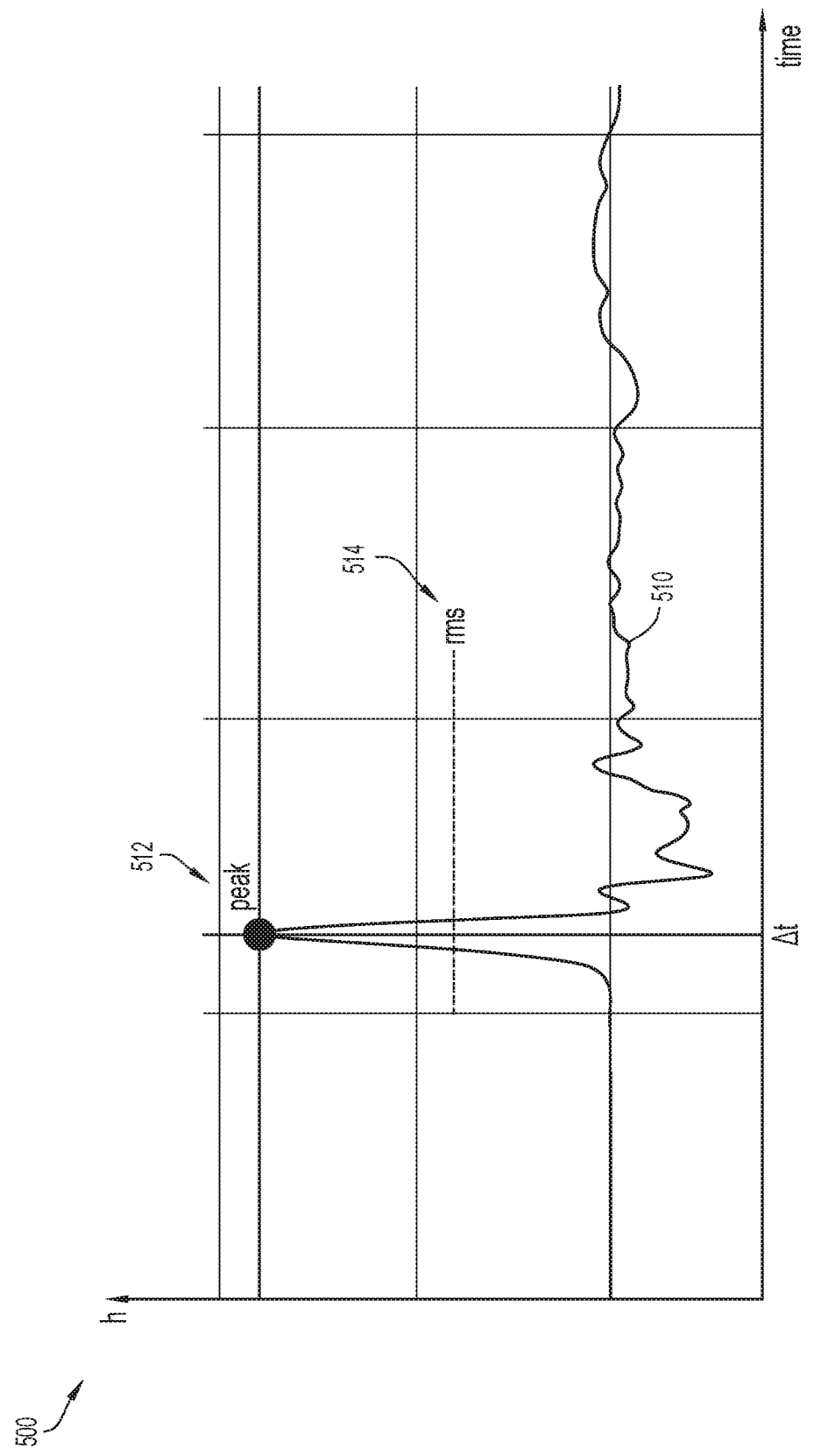

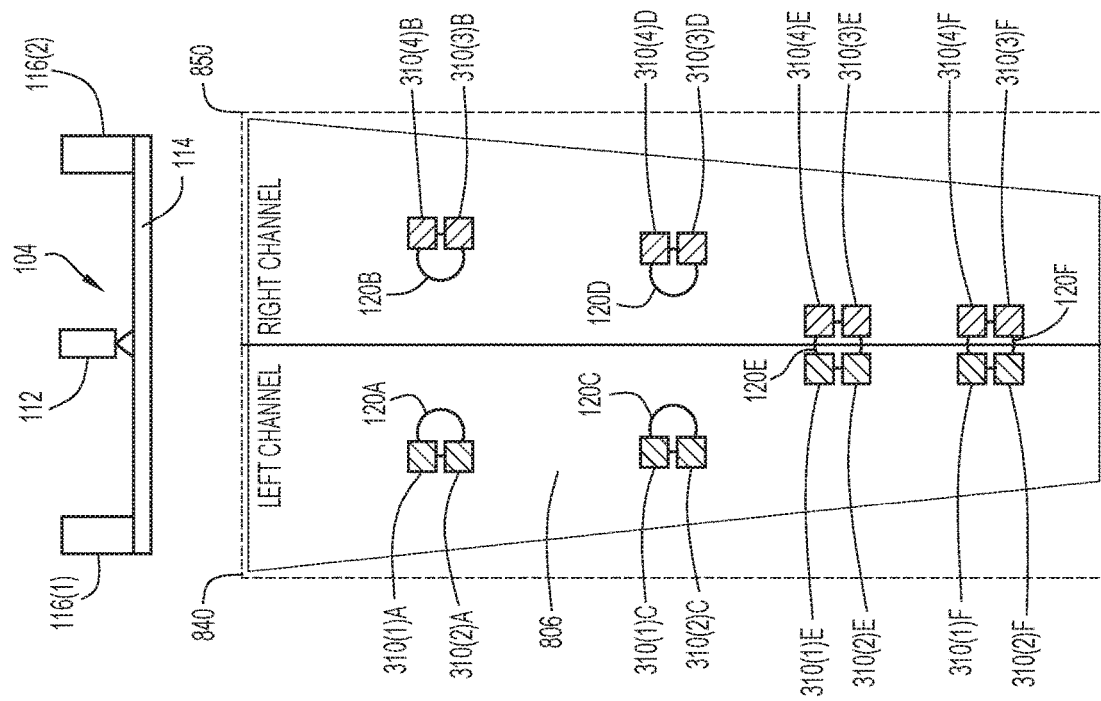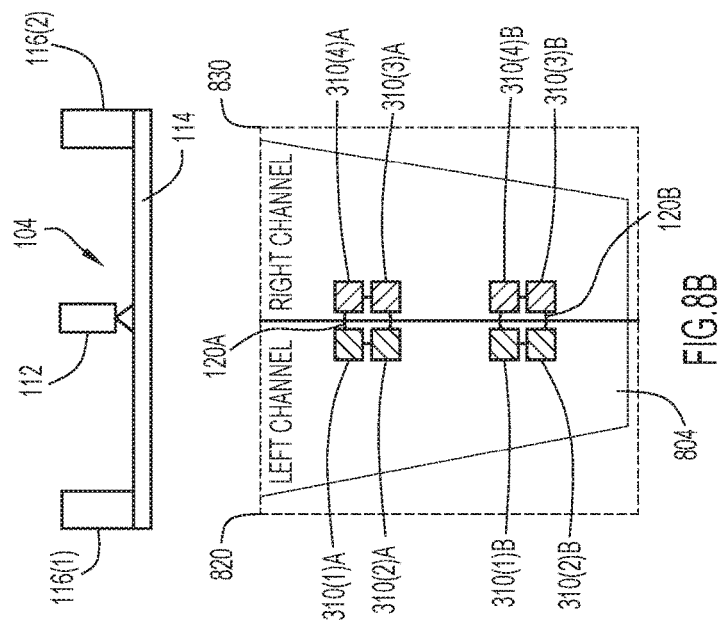

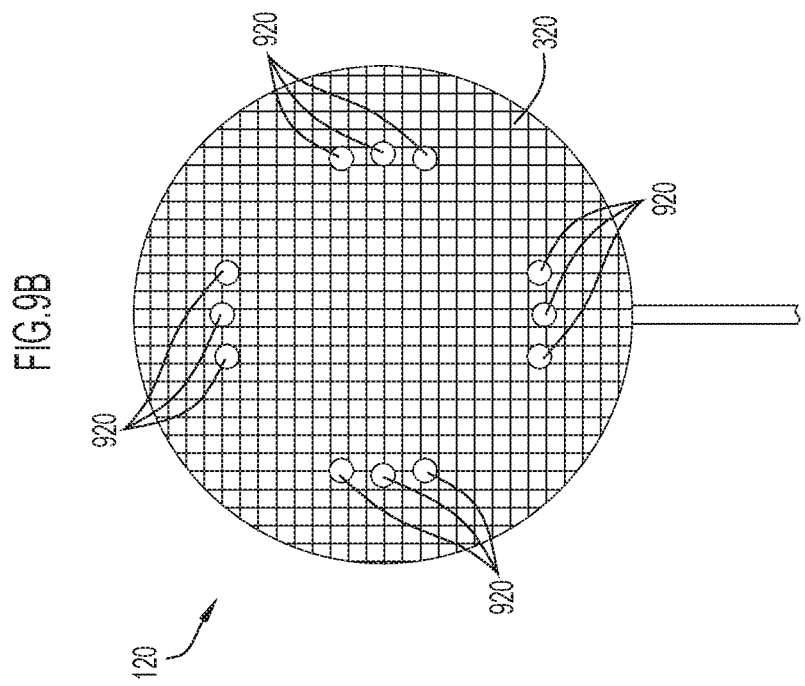
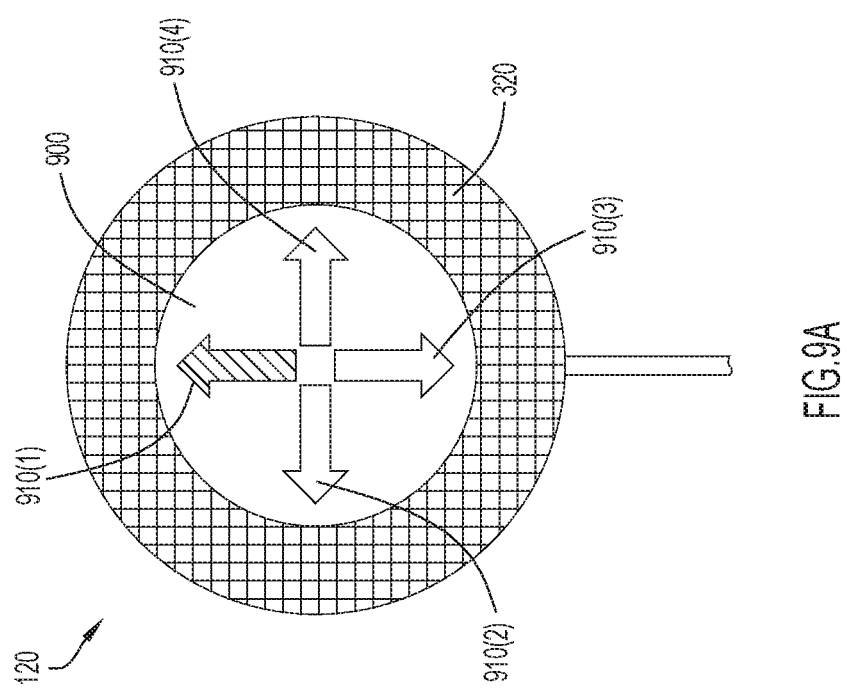

DETECTION OF MICROPHONE ORIENTATION AND LOCATION FOR DIRECTIONAL AUDIO PICKUP

TECHNICAL FIELD

The present disclosure relates to configuring components of a video conference endpoint in a conference room based on spatial detection of the components.

BACKGROUND

Video conference endpoints are often deployed in conference rooms. A useful feature in a video conference endpoint is directional audio (i.e., hearing a source of sound from approximately the same direction in which the video of the sound source is seen). Conventionally, directional microphones are capable of providing audio signals representative of a given sector in a conference room when the directional microphones are integrated into a table that serves as a component, or as part, of the video conference endpoint. Because these directional microphones are integrated into a dedicated table for the video conference endpoint, the directional microphones may have known geometrical relationships with respect to the camera system of the video conference endpoint. This reduces the flexibility of conference room setup, table design and microphone place for a video conference endpoint.

BRIEF DESCRIPTION OF THE DRAWINGS

FIG. 4 is a view of conference room showing a directional vector and coordinate position of a directional microphone assembly with respect to a video camera of a video conference endpoint, the directional microphone assembly being disposed on a conference table.

FIG. 5A is a plot of an example audio impulse response measured by a directional microphone of the directional microphone assembly illustrated in FIG. 3A.

FIGS. 8A-8C is are schematic diagrams illustrating examples of assignments of various directional microphones of a series of microphone assemblies to directional audio output channels of a video conference endpoint based on the positioning of the directional microphones with respect to a camera of the video conference endpoint, according to an example embodiment.

FIG. 9A is a schematic illustration of the directional microphone assembly shown in FIG. 3A equipped with a touch screen display, according to an example embodiment.

FIG. 9B is a schematic illustration of the directional microphone assembly shown in FIG. 3A equipped with a plurality of light emitting diodes, according to an example embodiment.

DESCRIPTION OF EXAMPLE EMBODIMENTS

Overview

Techniques presented herein relate to automatically determining the spatial relationship (i.e., spatial location and orientation) of microphone assemblies of a video conference endpoint with respect to the video conference endpoint. The video conference endpoint may include one or more display devices, one or more loudspeakers, one or more cameras, and one or more microphone arrays, where each one of these components may have a predetermined spatial relationship with respect to the other components. The video conference endpoint may further include one or more microphone assemblies that may be disposed on a table or within a conference room/conference environment in which the video conference endpoint is disposed. Each of the microphone assemblies may include a plurality of co-located directional microphones. The video conference endpoint may be configured to detect, by the plurality of co-located directional microphones of the microphone assembly, audio emitted from the loudspeaker of the video conference endpoint. The video conference endpoint may further be configured to generate data representing a spatial relationship of the microphone assembly with respect to the loudspeaker based on a compilation of the audio detected by the co-located directional microphones of the microphone assembly. Once the data representing the spatial relationship of the microphone assembly with respect to the loudspeaker is known, the video conference endpoint may be able to calculate data representing the spatial relationship of the microphone assembly with respect to a camera of the video conference endpoint.

Example Embodiments

Figure 1:
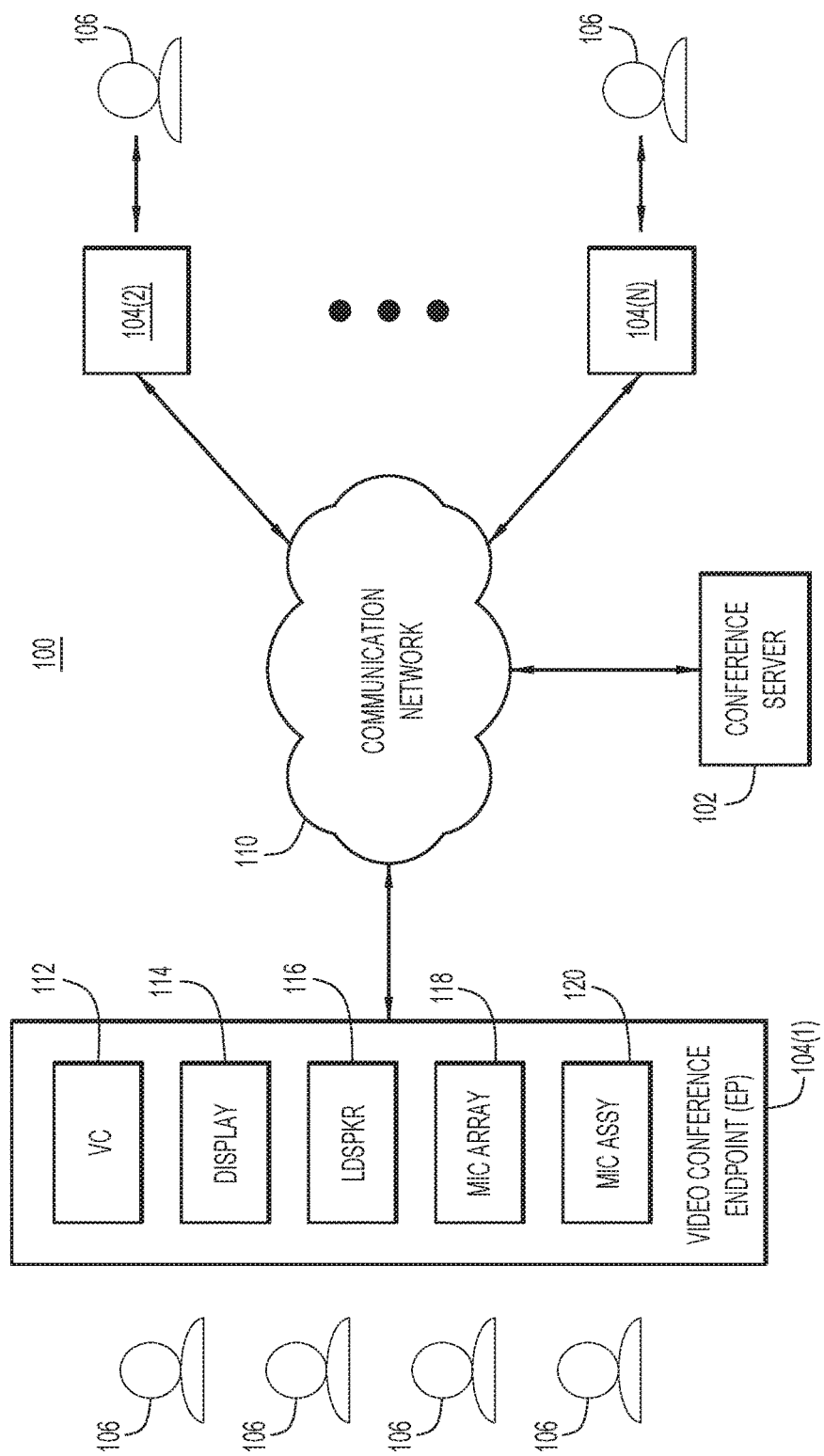
FIG. 1 is a block diagram of an example video conference (e.g., teleconference, collaboration, etc.) endpoint in which techniques may be implemented to automatically determine the spatial relationship of at least one component of the video conference endpoint, according to an example embodiment.

With reference to FIG. 1, there is depicted a block diagram of a video conference (e.g., teleconference, collaboration, etc.) system 100 in which automatic determination of the spatial location and orientation of directional microphone assemblies of a video conference endpoint with respect to other components of the video conference endpoint may be implemented, according to an example embodiment. Video conference system 100 includes a conference server 102 and collaboration endpoints or video conference endpoints 104(1)-104(N) operated by local users/participants 106 and configured to establish audio-visual teleconference collaboration sessions with each other over a communication network 110. Communication network 110 may include one or more wide area networks (WANs), such as the Internet, and one or more local area networks (LANs). The conference server 102 may be configured to coordinate the routing of audio-video streams among the video conference endpoints.

Each video conference endpoint 104 may include at least one video camera (VC) 112, at least one display device 114, one or more loudspeakers (LDSPKR) 116, and one or more microphones arrays (MIC ARRAY) 118. Each video conference endpoint 104 may further be associated with one or more microphone assemblies (MIC ASSY) 120. In a transmit direction, endpoints 104 capture audio/video from their local participants 106 with video camera 112/microphone array 118/microphone assembly 120, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via display device 114/loudspeaker 116. Endpoints 104 may be wired or wireless communication devices equipped with the aforementioned components, such as, but not limited to laptop and tablet computers, smartphones, dedicated video conference endpoints, etc. and the like.

Figure 2:
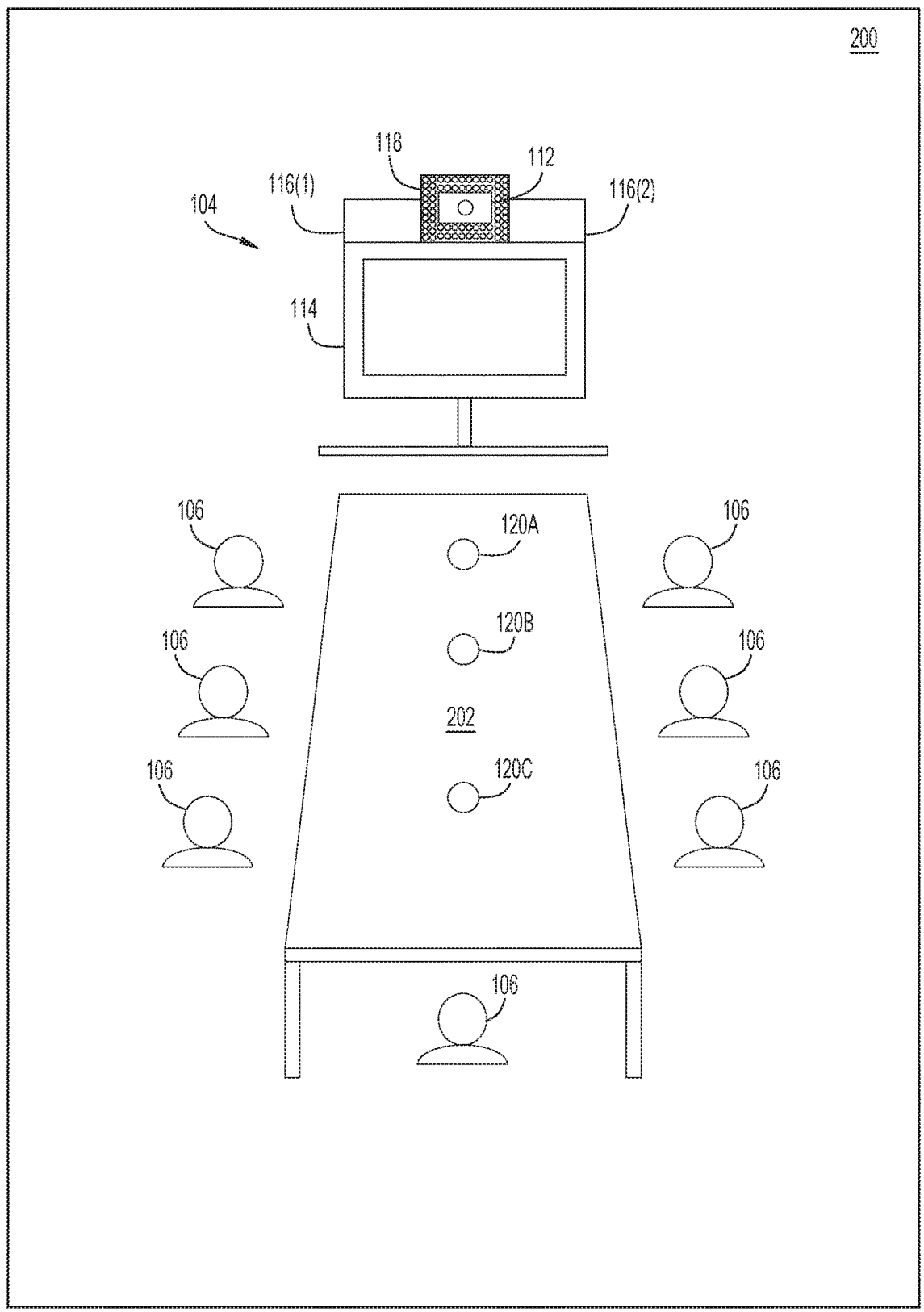
FIG. 2 is an illustration of an example video conference endpoint deployed in a conference room and configured to perform techniques presented herein, according to an example embodiment.

Referring now to FIG. 2, there is depicted an illustration of video conference endpoint 104 deployed in a conference room 200, according to an embodiment. Video conference endpoint 104 includes a display device 114 positioned in proximity to a conference table 202 disposed within the conference room 200. Display device 114 may be a screen configured to display content from video sources, and in one form, may be a user-interactive digital display device (e.g., a whiteboard or touch screen), etc. The camera 112 and the microphone array 118 have a predetermined positional/spatial relationship with respect to each other and to the display device 114. In some embodiments, the microphone array 118 may be integrated with an assembly that includes the camera 112. Camera 112 may be operated under control of endpoint 104 to capture video of different views or scenes of multiple participants 106 seated around the table 202 opposite from or facing (i.e., in front of) the camera 112 (and display device 114). The camera 112 depicted in FIG. 2 may be only one example of many possible camera and display device combinations that may be used, as would be appreciated by one of ordinary skill in the art (i.e., combining two video cameras for one display device). The camera 112 may include pan, tilt, and zoom (PTZ) features that may be implemented mechanically and/or digitally. In some forms, the display device 114 may be separate from the camera 112, and the microphone array 118 may be separate from the display device 114 and the camera 112.

Furthermore, the loudspeakers 116(1), 116(2) may have a predetermined positional/spatial relationship with respect to the display device 114, the camera 112, and/or the microphone array 118. The loudspeakers 116(1), 116(2) may also have a predetermined positional/spatial relationship to one another. In some embodiments, the loudspeakers 116(1), 116(2) may be integrated with the display device 114. While FIG. 2 illustrates two loudspeakers 116(1), 116(2) that are disposed or mounted atop the display device 114 and on adjacent sides of the camera 112 and microphone array 118, it should be appreciated that the endpoint 104 may include any number of loudspeakers that may be disposed in any location within or around the edge/frame of the display device 114, or located within close proximity to the display device 114, including, but not limited to, centrally within or behind the display device 114, centrally along the bottom edge of the frame of the display device 114, the bottom corners of the display device 114, etc. Thus, the loudspeakers 116(1), 116(2) are configured to generate audio projected toward the participants 106 disposed around the table 202 and within the conference room 200.

Continuing with FIG. 2, the microphone array 118 may be positioned adjacent to, integrated with (or otherwise in a known predetermined positional/spatial relationship to), the camera 112. In one embodiment, microphone array 118 may be a planar microphone array. The combination of the camera 112 with the microphone array 118 may be disposed adjacent to the display device 114, enabling the microphone array 118 to receive audio generated in the conference room 200 (i.e., from participants 106 in conference room 200, etc.).

As further depicted in the example of FIG. 2, and as briefly explained above, the video conference endpoint 104 may be associated with microphone assemblies 120A-120C. While three microphone assemblies 120A-120C are depicted in FIG. 2, the video conference endpoint 104 may include any number of microphone assemblies 120. As illustrated, the microphone assemblies 120A-120C may be disposed on conference table 202. As further described and depicted herein, the microphone assemblies 120A-120C may be disposed at any position or location on the table 202, or may be located at some other location (e.g., hanging from the ceiling, positioned on another surface, etc.) within the conference room 200. The microphone assemblies 120A-120C may be disposed within the conference room 200 such that microphone assemblies 120A-120C receive audio generated within the conference room 200 (i.e., from participants 106 in conference room 200, loudspeakers 116(1), 116(2), etc.).

The video conference endpoint 104 uses audio detection techniques to detect audio sources, i.e., loudspeakers 116(1), 116(2), by the microphone assemblies 120A-120C and to determine the spatial relationship between each of the microphone assemblies 120A-120C and the other components (i.e., the camera 112, the display device 114, the loudspeakers 116(1), 116(2), and/or the microphone array 118) of the video conference endpoint 104. As explained in more detail below, determination of the spatial relationship between each of the microphone assemblies 120A-120C and the other components of the video conference endpoint 104 may be utilized to set up the video conference endpoint 104 and/or continuously verify the location and/or orientation of the microphone assemblies 120A-120C with respect to the video conference endpoint 104 by emitting or outputting audio by at least one of the loudspeakers 116(1), 116(2) and receiving the emitted audio by the microphone assemblies 120A-120C.

In accordance with embodiments presented herein, video conference endpoint 104 establishes the spatial relationship (i.e., coordinate location and angular orientation/rotation) between the microphone assemblies 120A-120C and the camera 112, the display device 114, the loudspeakers 116(1), 116(2), and/or the microphone array 118 so that the microphone assemblies 120A-120C may be utilized by the video conference endpoint 104 to provide accurate directional audio information during collaboration sessions with other video conference endpoints. With one or more microphone assemblies 120A-120C located in close proximity to the sound sources (i.e., the participants 106), and with a known spatial relationship between the microphone assemblies 120A-120C and components (i.e., the camera 112, the display device 114, the loudspeakers 116(1), 116(2), and/or the microphone array 118) of the video conference endpoint 104, the video conference endpoint 104 may provide directional audio that matches the video output of the camera 112, even when there are simultaneous sound sources present in the same room and need distinguishing between (i.e., the emitted audio matches the location of the sound source on the video output). More specifically, when the spatial relationship between the microphone assemblies 120A-120C and other video endpoint components (i.e., the camera 112, the display device 114, the loudspeakers 116(1), 116(2), and/or the microphone array 118) of the video conference endpoint 104 are known, the video conference endpoint 104 can determine the appropriate channel (e.g., left audio channel representing the left side of the conference table 202 or conference room 200, right audio channel representing the right side of the conference table 202 or conference room 200) to route the audio capture by the microphone assemblies 120A-120C.

Figure 3A:
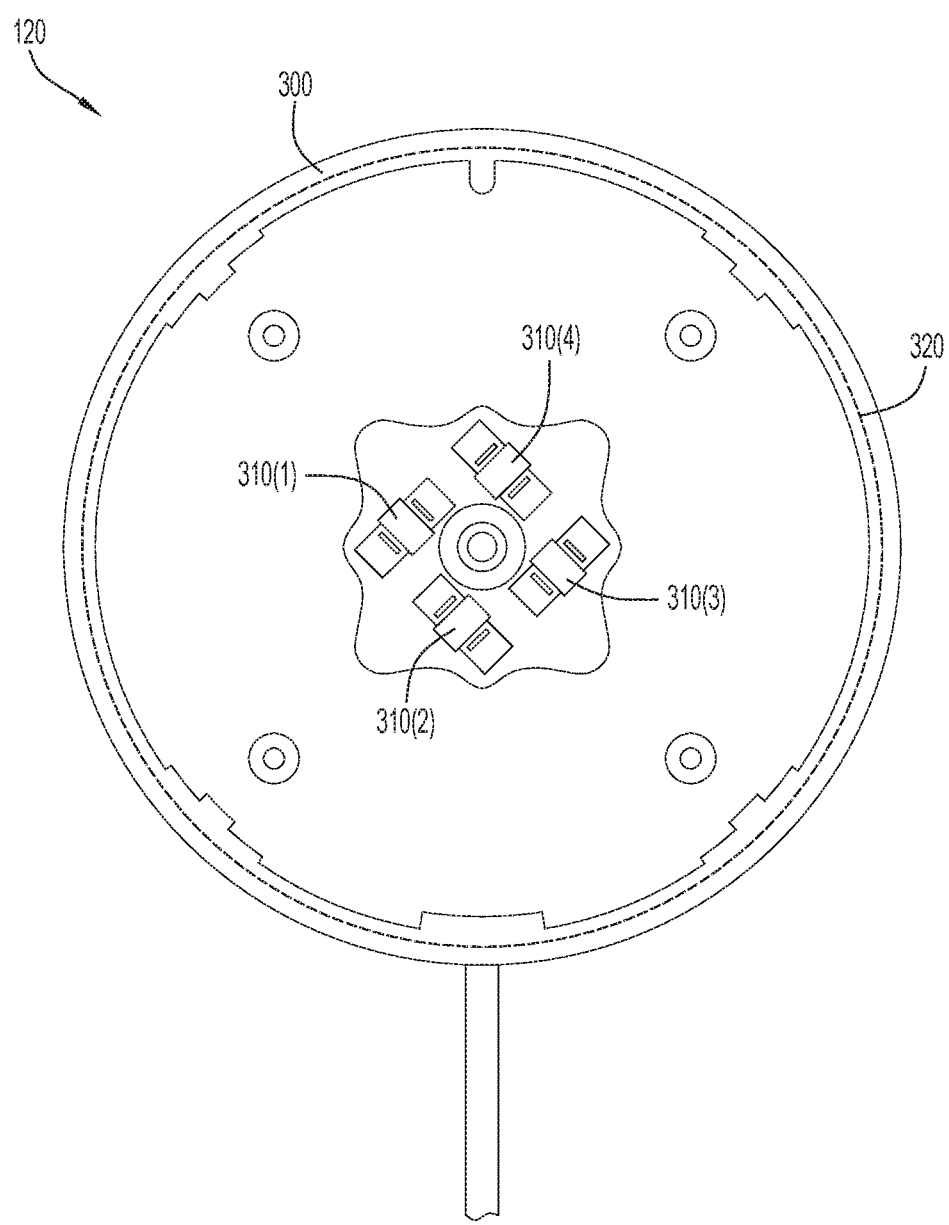
FIG. 3A is a top view showing microphone elements of a directional microphone assembly of a video conference endpoint configured to perform techniques presented herein, according to an example embodiment.

Turning to FIG. 3A, illustrated is a top view of an example embodiment of a microphone assembly 120. The microphone assembly 120 may include a base structure 300 and a plurality of directional microphones or microphone elements 310(1)-310(4) disposed on the base structure 300. While the embodiment of the microphone assembly 120 illustrated in FIG. 3A contains four directional microphones 310(1)-310(4), other embodiments of the microphone assembly 120 may include any number of directional microphones 310. Furthermore, the microphone assembly 120 may further include a cover 320 (shown in phantom) that is coupled to the base structure 300 and covers the directional microphones 310(1)-310(4). The cover 320 may be configured to protect the directional microphones 310(1)-310(4), while still enabling the directional microphones 310(1)-310(4) to receive and transduce audio.

Figure 3B:
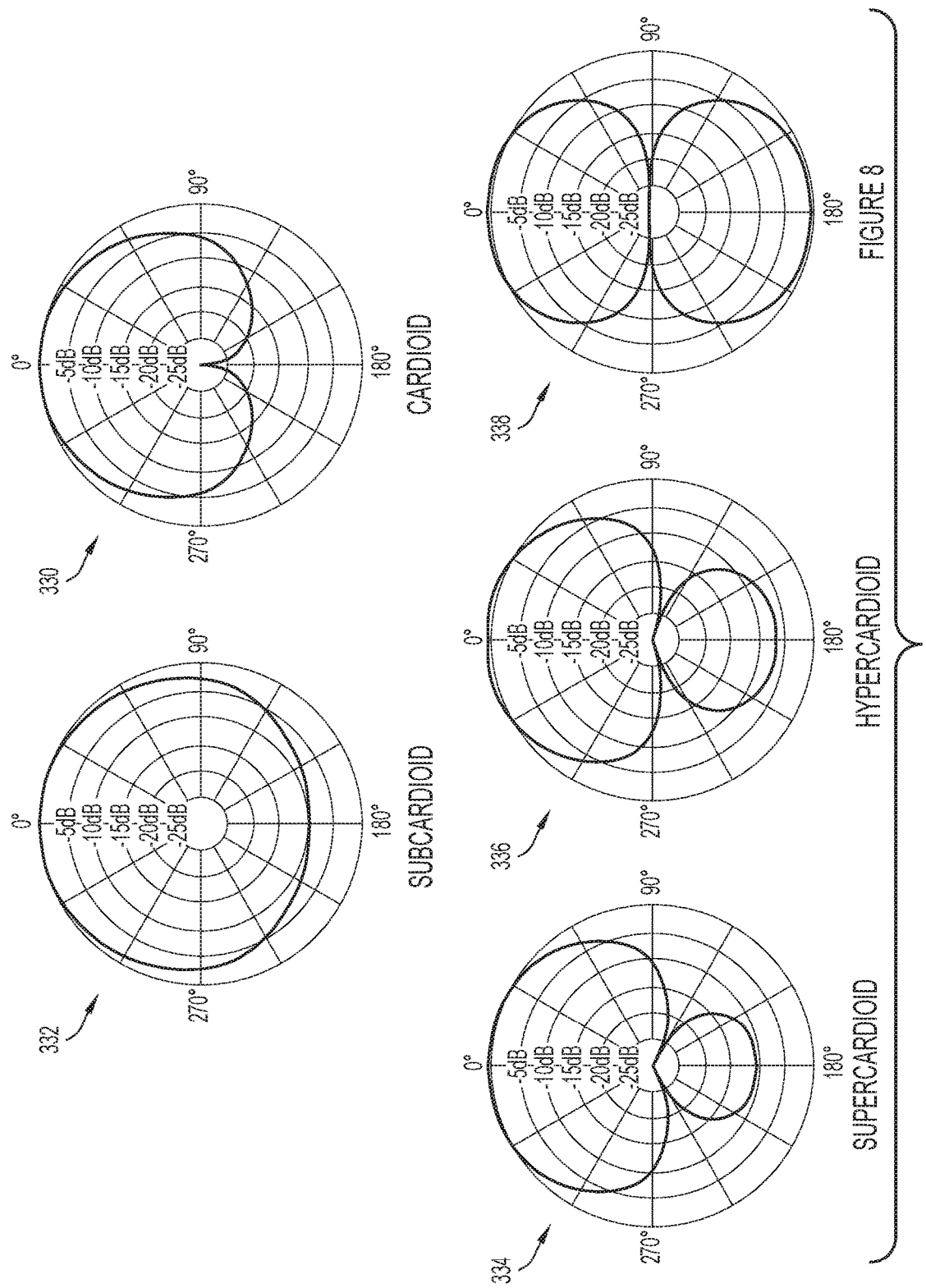
FIG. 3B is a diagram of various polar patterns utilized by the directional microphones of the directional microphone assembly illustrated in FIG. 3A.

Each of the directional microphones 310(1)-310(4) of the microphone assembly 120 may have a known polar pattern. In some embodiments, the directional microphones 310(1)-310(4) may each have the same polar pattern, while, in other embodiments, the directional microphones 310(1)-310(4) may have of a variety of polar patterns. The polar pattern of a microphone determines the sound sensitivity of the microphone at various angles (i.e., it defines how much of the sound or audio signal that will be picked up by the microphone at different directions or angles with respect to the microphone). Illustrated in FIG. 3B, and with continued reference to FIG. 3A, the directional microphones 310(1)-310(4) may have one of, but not limited to, the following polar patterns: cardioid 330, subcardioid 332, supercardioid 334, hypercardioid 336, figure eight 338, etc. As shown in FIG. 3B, a microphone having the cardioid polar pattern 330, for example, is most sensitive to sound or audio arriving from the 0° angle (i.e., straight ahead of the microphone), while being least sensitive to sound or audio arriving from the 180° angle (i.e., behind the microphone).

Figure 3C:
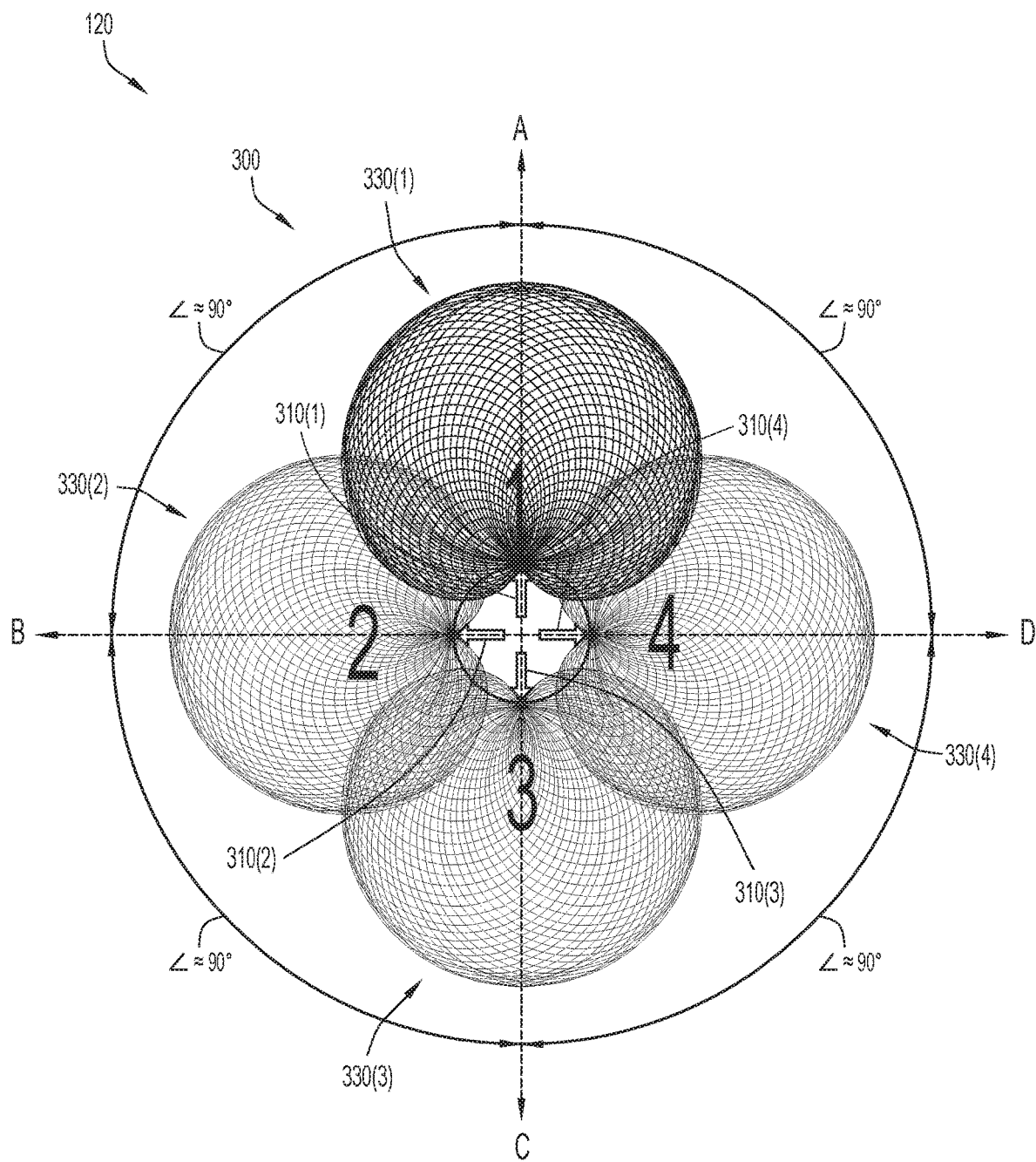
FIG. 3C is a schematic view illustrating cardioid polar patterns of the directional microphone assembly illustrated in FIG. 3A.

With reference to FIGS. 3A and 3C, and continued reference to FIG. 3B, the directional microphones 310(1)-310(4) may be cardioid directional microphones (i.e., directional microphones with a cardioid polar pattern 330) that are positioned within the microphone assembly 120 such that the directional microphones 310(1)-310(4) are co-located, or nearly co-located with one another, and such that the cardioid polar patterns 330(1)-330(4) of the directional microphones 310(1)-310(4), respectively, have a known orientation with respect to the cardioid polar patterns 330(1)-330(4) of the other directional microphones 310(1)-310(4), respectively. The terms co-located and near co-located mean that the directional microphones 310(1)-310(4) are located in such close proximity to one another that they are nearly in the same location as one another (i.e., have nearly the same spatial coordinates as one another with respect to the components of the video conference endpoint). Co-located, or nearly co-located, directional microphones 310(1)-310(4) may be so closely located to one another that time-of-arrival methods may be unable to determine unique positions and/or orientations of the directional microphones 310(1)-310(4) with respect to other devices (e.g., a loudspeaker), and with respect to each other, because the time-delay differences between the co-located, or nearly co-located, directional microphones 310(1)-310(4) may be too small.

As further illustrated in the schematic illustration of the microphone assembly 120 of FIG. 3C, each of the directional microphones 310(1)-310(4) has a cardioid polar pattern 330(1)-330(4), respectively, that is perpendicular to its adjacent or neighboring directional microphone's polar cardioid polar pattern 330(1)-330(4), and that is directed in an opposite direction of the cardioid polar pattern 330(1)-330(4) of the opposing directional microphone 310(1)-310(4), respectively. The schematic illustration of the microphone assembly 120 of FIG. 3C is intended to show that the cardioid polar patterns 330(1)-330(4) of the directional microphones 310(1)-310(4), respectively, may generally be directed in certain directions, and may not account for the offset between the directional microphones 310(1)-310(4) of the example embodiment illustrated in FIG. 3A. Thus, as schematically shown in FIG. 3C, the cardioid polar pattern 330(1) of the first directional microphone 310(1) is directed along vector A. The second directional microphone 310(2) is adjacent to the first directional microphone 310(1), and has a cardioid polar pattern 330(2) that is directed along vector B, which is generally perpendicular to, or offset approximately 90° from, vector A. The fourth directional microphone 310(4) is also adjacent the first direction microphone 310(1), and has a cardioid polar pattern 330(4) that is directed along vector D, which is generally perpendicular to, or offset approximately 270° from, vector A. The third directional microphone 310(3) is opposite the first directional microphone 310(1), and has a cardioid polar pattern 330(3) that is directed along vector C, which is generally opposite of, or offset approximately 180° from, vector A.

In the example embodiment of the microphone assembly 120 described above, each of the directional microphones 310(1)-310(4) may serve as a single source of a transduced audio signal for audio that is received at the microphone assembly 120. According to other embodiments of the microphone assembly 120, the microphone assembly may be equipped with a plurality of microphones that may have their transduced audio signals mixed (via coherent array processing) to form directive virtual microphones (i.e., the microphones may have directional polar patterns that can differ in direction and shape from the physical microphone elements). In even further embodiments of the microphone assembly 120, a microphone assembly may be an array of directional microphones that are not co-located, but that have omni-directional polar patterns, which may be subsequently combined into virtual directional co-located patterns.

Turning to FIG. 4, illustrated is a schematic view of a conference room 200 that contains a video conference endpoint 104, a conference table 202, and a microphone assembly 120 disposed on the table 202. The video conference endpoint 104 illustrated in FIG. 4 contains at least one camera 112, two display devices 114(1), 114(2), and two loudspeakers 116(1), 116(2), each of which may have a predetermined positional/spatial relationship with one another. FIG. 4 illustrates that the microphone assembly 120 may have a spatial relationship to the camera 112 of the video conference endpoint 104. As previously explained, this spatial relationship may include a specific location of the microphone assembly 120 within a coordinate system $(x_c, y_c, z_c)$ with respect to the camera 112, as well as an angular rotation $\delta_c$ with respect to a vector $n_c$, which is a vector that is normal to the camera 112. In accordance with techniques presented herein, and as further explained below, the video conference endpoint 104 may utilize emitted audio from at least one of the loudspeakers 116(1), 116(2) to ultimately calculate both the spatial coordinates $(x_c, y_c, z_c)$ of the microphone assembly 120, and the rotational angle $\delta_c$ of the microphone assembly 120 (i.e., orientation), with respect to the camera 112.

Turning to FIG. 5A, and with continued reference to FIGS. 3A-3C and 4, illustrated is a plot 500 of an example of the direct sound portion of an acoustic impulse response 510 from one of the loudspeakers 116(1), 116(2) to a microphone (e.g., one of the directional microphones 310 (1)-310(4) of the microphone assembly 120). The term direct sound or direct sound portion refers to the portion of the acoustic impulse response that corresponds with sound that travels directly from the loudspeaker to the microphone, and does not include other influences of the sound such as reflections or reverberations (i.e., the direct sound or direct sound portion is the time-windowed early portion of the acoustic impulse response). The reflection of sound from the table surface will arrive with very short time delay after the direct sound, and will therefore be included in the early portion. This will not influence the methods described herein. The largest peak 512 of the direct sound portion of the impulse response 510 indicates when the sound emitted from one of the loudspeakers 116(1), 116(2) is received by one of the directional microphones 310(1)-310(4). With the direct sound portions of the acoustic impulse responses known for an emitted audio signal by one of the loudspeakers 116(1), 116(2), the root mean square (hereinafter "RMS") 514 value of the direct sound portions, or time-windowed early part, of the acoustic impulse responses may be calculated, which, as further explained below, can be ultimately used to determine the rotational angle (pc of the microphone assembly 120 and the spatial coordinates $(x_c, y_c, z_c)$ of the microphone assembly 120 with respect to the camera 112.

Figure 5B:
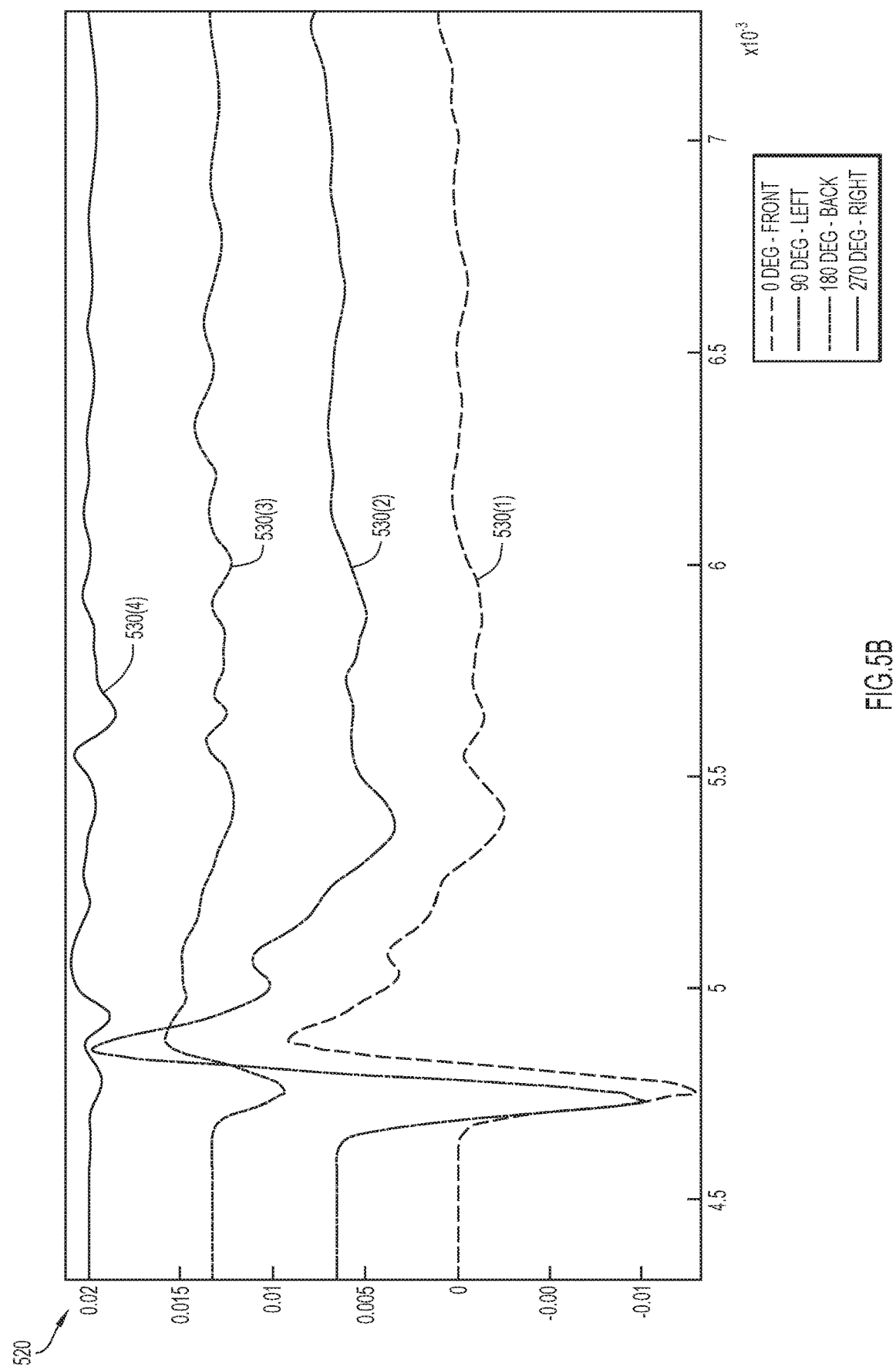
FIG. 5B is a graph of an example of a compilation of audio impulse responses measured by each of the microphones elements of the microphone assembly illustrated in FIG. 3A.

Turning to FIG. 5B, and with continued reference to FIGS. 3A-3C and 4, illustrated is are plots 520 of a compilation of the direct sound portions of the acoustic impulse responses 530(1)-530(4) over a period of time when audio emitted from one of the loudspeakers 116(1), 116(2) is received and transduced by the directional microphones 310(1)-310(4) of the microphone assembly 120. As previously explained, the directional microphones 310(1)-310(4) may have cardioid polar patterns 330(1)-330(4), respectively, and each directional microphone 310(1)-310(4) may be oriented perpendicular to its adjacent directional microphones 310(1)-310(4). Because of the known cardioid polar patterns 330(1)-330(4) and the orientation of the directional microphones 310(1)-310(4), the direct sound portions of the acoustic impulse responses 530(1)-530(4) differ between directional microphones 310(1)-310(4) based on the rotational positioning of the microphone assembly 120. As illustrated in FIG. 5B, the peaks of the acoustic impulse responses 530(1), 530(2) of the first and second directional microphones 310(1), 310(2), respectively, are greater than peaks of the impulse responses 530(3), 530(4) of the third and fourth directional microphones 310(3), 310(4), respectively. Moreover, the peak of the acoustic impulse response 530(2) of the second directional microphone 310(2) is greater than the peak of the acoustic impulse response 530(1) of the first directional microphone 310(1), while the peak of the acoustic impulse response 530(3) of the third directional microphone 310(3) is greater than the peak of the acoustic impulse response 530(4) of the fourth directional microphone 310(4). From the plots 520, one could roughly infer that the microphone assembly 120 may be disposed on the table 202 of the conference room 200 such that the first and second directional microphones 310(1), 310(2) generally face toward the loudspeaker 116(1) emitting the audio, while the third and fourth directional microphones 310(3), 310(4) generally face away from the loudspeaker 116(1). It may be further inferred that the first directional microphone 310(1) may be more rotationally offset from the loudspeaker 116(1) than the second directional microphone 310(2) since peak of the direct sound portion of the impulse response 530(2) of the second directional microphone 310(2) is greater than the peak of the direct sound portion of the impulse response 530(1) of the first directional microphone 310(1). With the acoustic impulse responses 530(1)-530(4) captured or measured for each of the directional microphones 310(1)-310(4) of the microphone assembly, the RMS values for each direct sound portion of the acoustic impulse response 530(1)-530(4) may then be calculated using time window on and around the direct sound portion of the acoustic impulse response. This time window may be identical or the same for each of the directional microphones 310(1)-310(4).

Figure 6A:
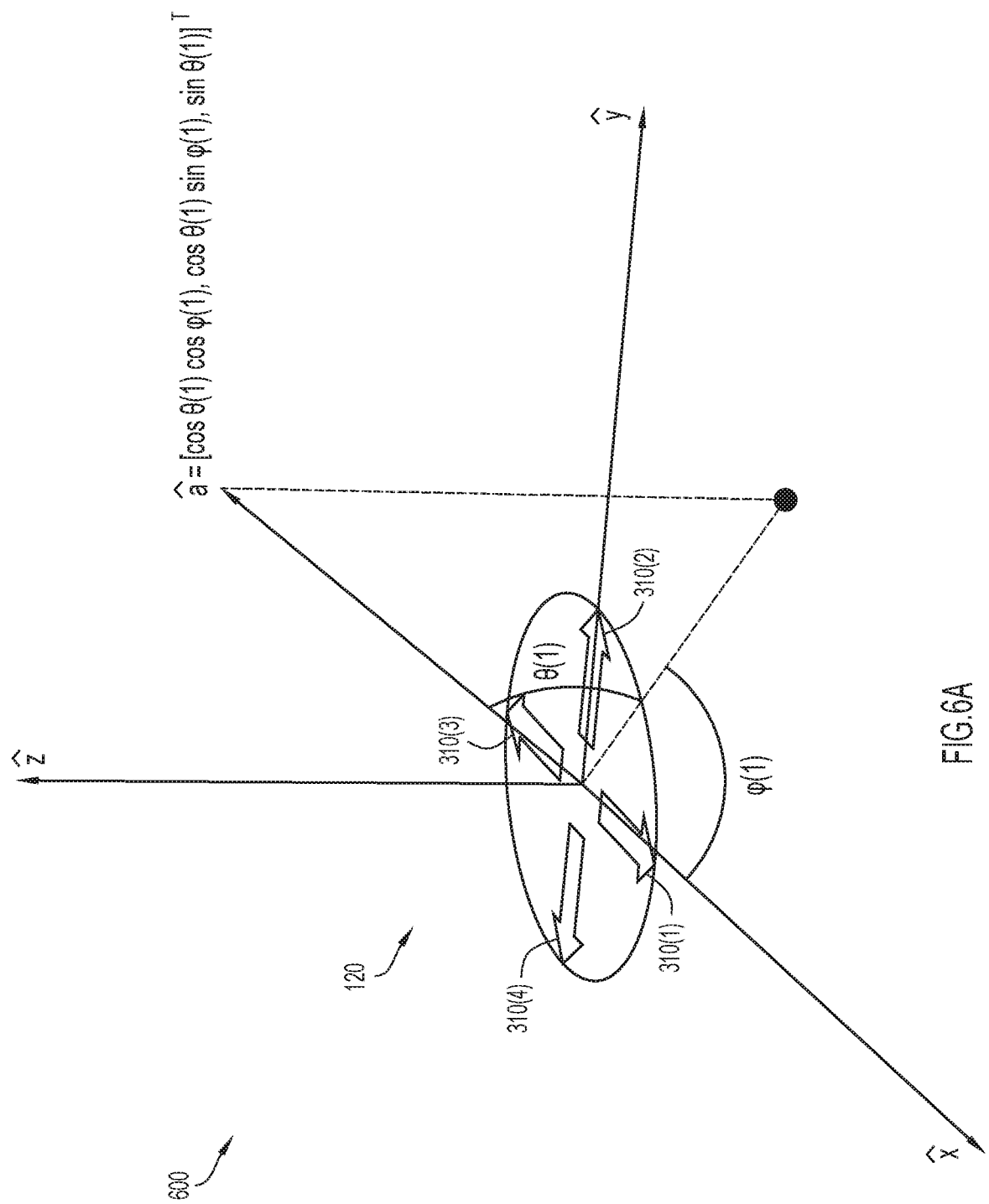
FIG. 6A is a schematic diagram of the directional microphone assembly and various vectors in a coordinate system, and depicting how a rotational angle of the directional microphone assembly with respect to a loudspeaker of a video conference endpoint is calculated, in accordance with an example embodiment.

Turning to FIG. 6A, and with continued reference to FIGS. 3A-3C, 4, 5A, and 5B, illustrated is a schematic representation 600 of a microphone assembly 120 in a coordinate system that is based at, or centered on, the microphone assembly 120. The x-axis and the y-axis are located in the plane of the table 202 on which the microphone assembly 120 is placed, while the z-axis extends vertically from the table 202 and microphone assembly 120. Vector a in FIG. 6A is a vector that is directed from the center of the microphone assembly to the loudspeaker 116 that is emitting audio that is captured by the directional microphones 310(1)-310(4) of the microphone assembly 120. The vector a may be defined by the equation:

$$a = [\cos\theta(1)\cos\varphi(1), \cos\theta(1)\sin\varphi(1), \sin\theta(1)]^T$$

where, as illustrated in FIG. 6A, θ(1) represents the elevation angle between the microphone assembly 120 and the loudspeaker 116(1) emitting the audio captured by the microphone assembly 120 (i.e., the angle representing the height difference between the microphone assembly 120 and the loudspeaker 116 along the z-axis), and φ(1) represents the rotation angle between the microphone assembly 120 and the loudspeaker 116(1) emitting the audio captured by the microphone assembly 120 (i.e., the angle representing the offset between the direction that the first directional microphone 310(1) of the microphone assembly 120 is facing and the direction from the microphone assembly 120 to the loudspeaker 116(1)). With the RMS values determined from the direct sound portions of the acoustic impulse responses 530(1)-530(4), as explained previously with regard to FIGS. 5A and 5B, the rotational angle φ(1) may be calculated by the video conference endpoint 104 using the equation:

$$\varphi = \arctan((H_2 - H_4)/(H_1 - H_3))$$

where $H_1$ is the RMS value of a time window around the first direct sound portion of the acoustic impulse response 530(1) of the first directional microphone 310(1) of the microphone assembly 120, $H_2$ is the RMS value of the time window around the second direct sound portion of the acoustic impulse response 530(2) of the second directional microphone 310(2) of the microphone assembly 120, $H_3$ is the RMS value of the time window around the third direct sound portion of the acoustic impulse response 530(3) of the third directional microphone 310(3) of the microphone assembly 120, and $H_4$ is the RMS value of the time window around the fourth direct sound portion of the acoustic impulse response 530(4) of the fourth directional microphone 310(4) of the microphone assembly 120. The RMS value of the early part of the impulse response is used as an estimate of the direct sound level of the impulse response. Other level calculation or peak detection methods can be used as well.

In some embodiments, once the rotation angle φ(1) with respect to the first loudspeaker 116(1) is known, the second loudspeaker 116(2) may emit audio that is received by the microphone assembly 120 to determine the rotation angle φ(2) with respect to the second loudspeaker 116(2). Thus, this technique and calculation may be performed for each loudspeaker 116 of a video conference endpoint 104.

Figure 6B:
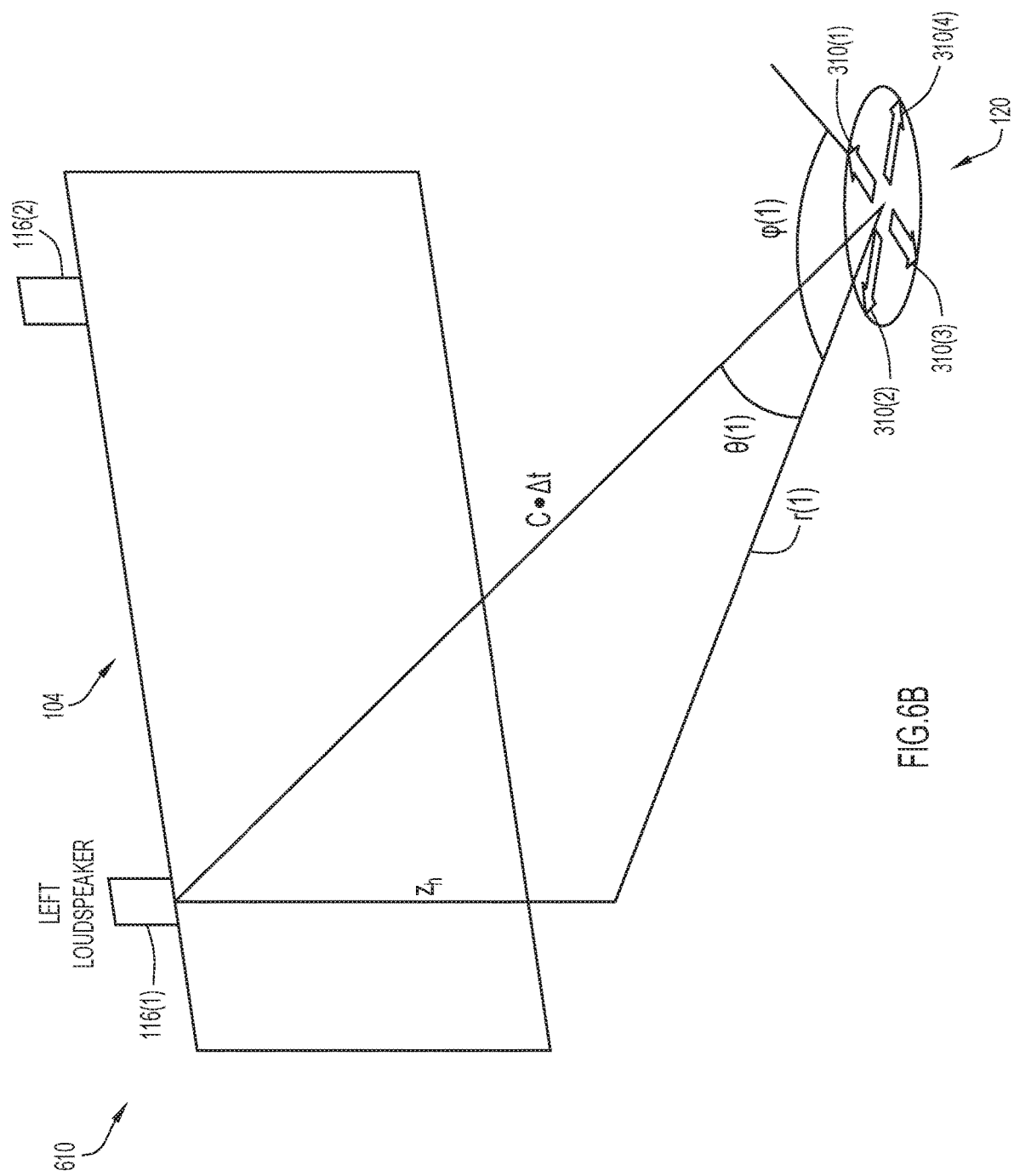
FIG. 6B is a schematic diagram of the positioning of the directional microphone assembly with respect to a loudspeaker of a video conference endpoint, and depicting how the planar distance and elevation angle of the directional microphone assembly with respect to the loudspeaker is calculated, in accordance with an example embodiment.

Turning to FIG. 6B, and with continued reference to FIGS. 3A-3C, 4, 5A, 5B, and 6A, illustrated is a schematic representation 610 of the microphone assembly 120 in a spatial orientation with respect to the video conference endpoint 104, and more specifically, with respect to the first loudspeaker 116(1) of the video conference endpoint 104. Once the rotational angle φ(1) has been calculated for the microphone assembly 120 with respect to the loudspeaker 116(1) emitting the audio received by the microphone assembly 120, the distance r(1) and elevation angle θ(1) may be calculated if the latency of the codec audio output and microphone assembly 120 input is known and controlled by the video conference endpoint 104. The video conference endpoint 104 may use acoustic propagation delay techniques, or time-of-flight techniques, to determine the time Δt it takes for the audio emitted from the loudspeaker 116(1) to be received by the directional microphones 310(1)-310(4) of the microphone assembly 120. In other words, the video conference endpoint 104 may use the compiled acoustic impulse responses 530(1)-530(4) of the directional microphones 310(1)-310(4) to measure the time Δt between the loudspeaker 116(1) emitting the audio and the directional microphones 310(1)-310(4) receiving the emitted audio. One such technique is to detect the initial time delay from the impulse response which is already available, and correct for the known latency in the equipment. The height $z_h$ of the loudspeaker 116(1) above the table 202 may be assumed, estimated, and/or measured, while c is a constant that may represent the speed of sound. Once the video conference endpoint 104 has measured the time Δt, and has received a value for the height $z_h$ from the user or has assumed a value for the height $z_h$, the video conference endpoint 104 may use the following equation:

$$r = \sqrt{(\Delta t \cdot c)^2 - z_h^2}$$

to calculate the distance r(1) between the microphone assembly 120 and the loudspeaker 116(1). With the values for $z_h$, c, Δt, and r(1) being known, the value for the elevation angle θ(1) may be calculated using known mathematical computations/techniques. In other embodiments, the elevation angle θ(1) may be directly calculated from the direct sound portions of the acoustic impulse responses 530(1)-530(4).

In some embodiments, once the distance r(1) and elevation angle θ(1) with respect to the first loudspeaker 116(1) are known, the second loudspeaker 116(2) may emit audio that is received by the microphone assembly 120 to determine the distance r(2) and elevation angle θ(2) with respect to the second loudspeaker 116(2). Thus, this technique and calculation may be performed for each loudspeaker 116 of a video conference endpoint 104. In other embodiments, the difference in propagation delay between the first loudspeaker 116(1) and the microphone assembly 120 and that of the second loudspeaker 116(2) and the microphone assembly 120 is measured instead of the absolute propagation delays, thus avoiding need to know the latency of the codec audio output and microphone assembly 120 input.

Figure 6C:
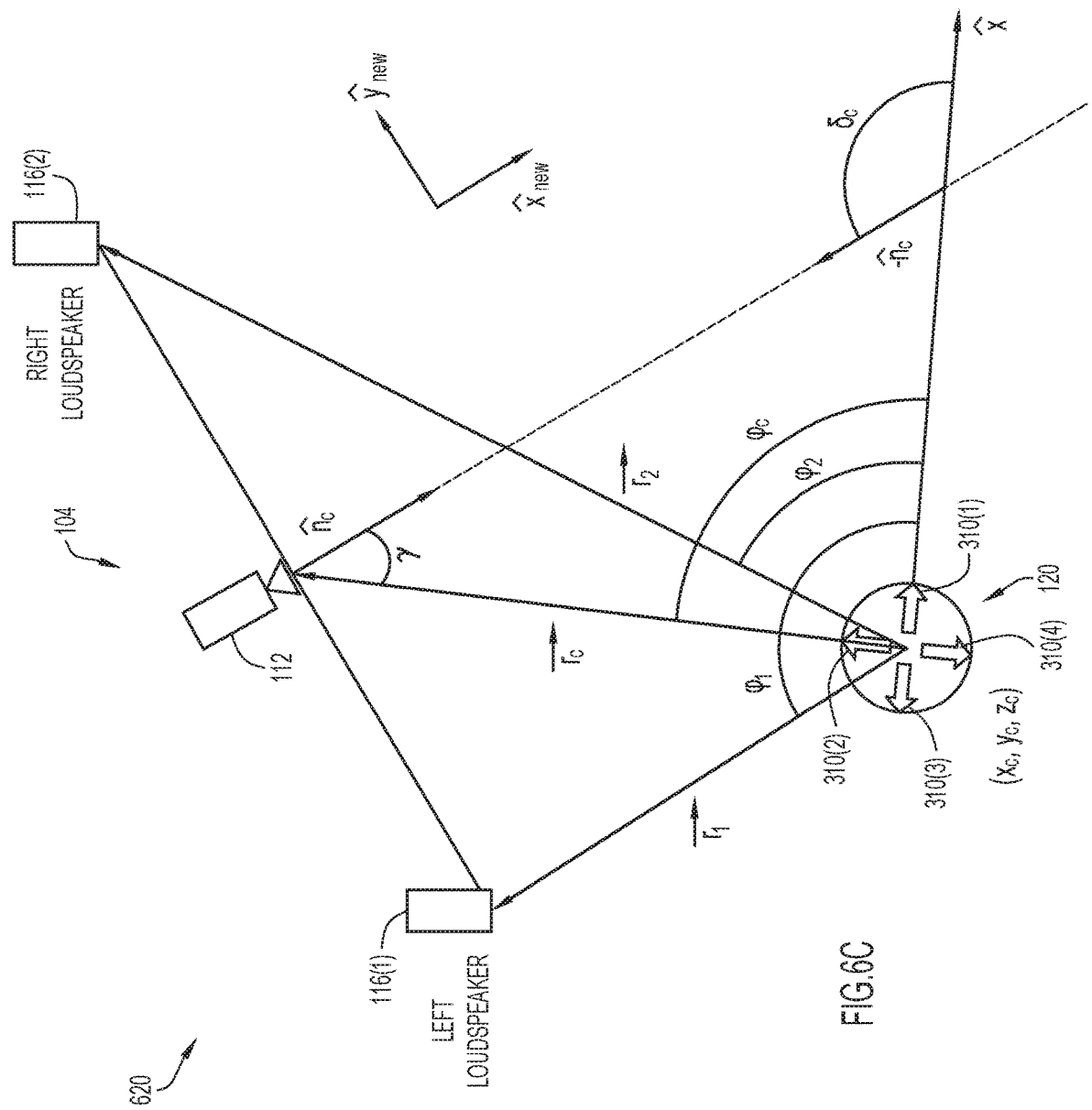
FIG. 6C is a schematic diagram of the positioning of the directional microphone assembly with respect to the loudspeakers and a camera of a video conference endpoint, and depicting how the spatial location and orientation of the directional microphone assembly with respect to the camera is calculated, in accordance with an example embodiment.

Turning to FIG. 6C, and with continued reference to FIGS. 3A-3C, 4, 5A, 5B, 6A, and 6B, illustrated is a schematic representation 620 of the microphone assembly 120 in a spatial orientation with respect to the loudspeakers 116(1), 116(2) and to the camera 112 of the video conference endpoint 104. With the rotational angles φ(1), φ(2), the elevation angles θ(1), θ(2), and the distances r(1), r(2) between the microphone assembly 120 and the loudspeakers 116(1), 116(2) determined, and with the loudspeakers 116(1), 116(2) having a predetermined positional/spatial relationship with respect to a camera 112, the spatial relationship (i.e., spatial coordinates ($x_c$, $y_c$, $z_c$) of the microphone assembly 120 in a coordinate system centered on the camera 112, and rotational angle $\delta_c$ (i.e., orientation) of the microphone assembly 120 with respect to the axis of the camera 112) of the microphone assembly 120 may be determined through known triangulation techniques. In the schematic representation 620 of FIG. 6C, vectors $n_c$, $-n_c$ are vectors that are normal to the camera 112, vector $r_c$ represents the horizontal distance between the camera 112 and the microphone assembly 120, y represents the angular offset of the microphone assembly 120 from the normal vector $n_c$ (i.e., the angle between the vector $n_c$ and the vector $r_c$), and $\delta_c$ represents the angular offset of the direction of the first directional microphone 310(1) of the microphone array 120 from the vector $-n_c$. With rotational angles φ(1), φ(2), elevation angles θ(1), θ(2), and distances r(1), r(2) being known by the video conference endpoint 104, the video conference endpoint 104 may use conventional triangulation techniques to calculate the variables $\varphi_c$, $r_c$, γ, and $\delta_c$, as well as the spatial coordinates ($x_c$, $y_c$, $z_c$) of the microphone assembly 120.

Figure 7:
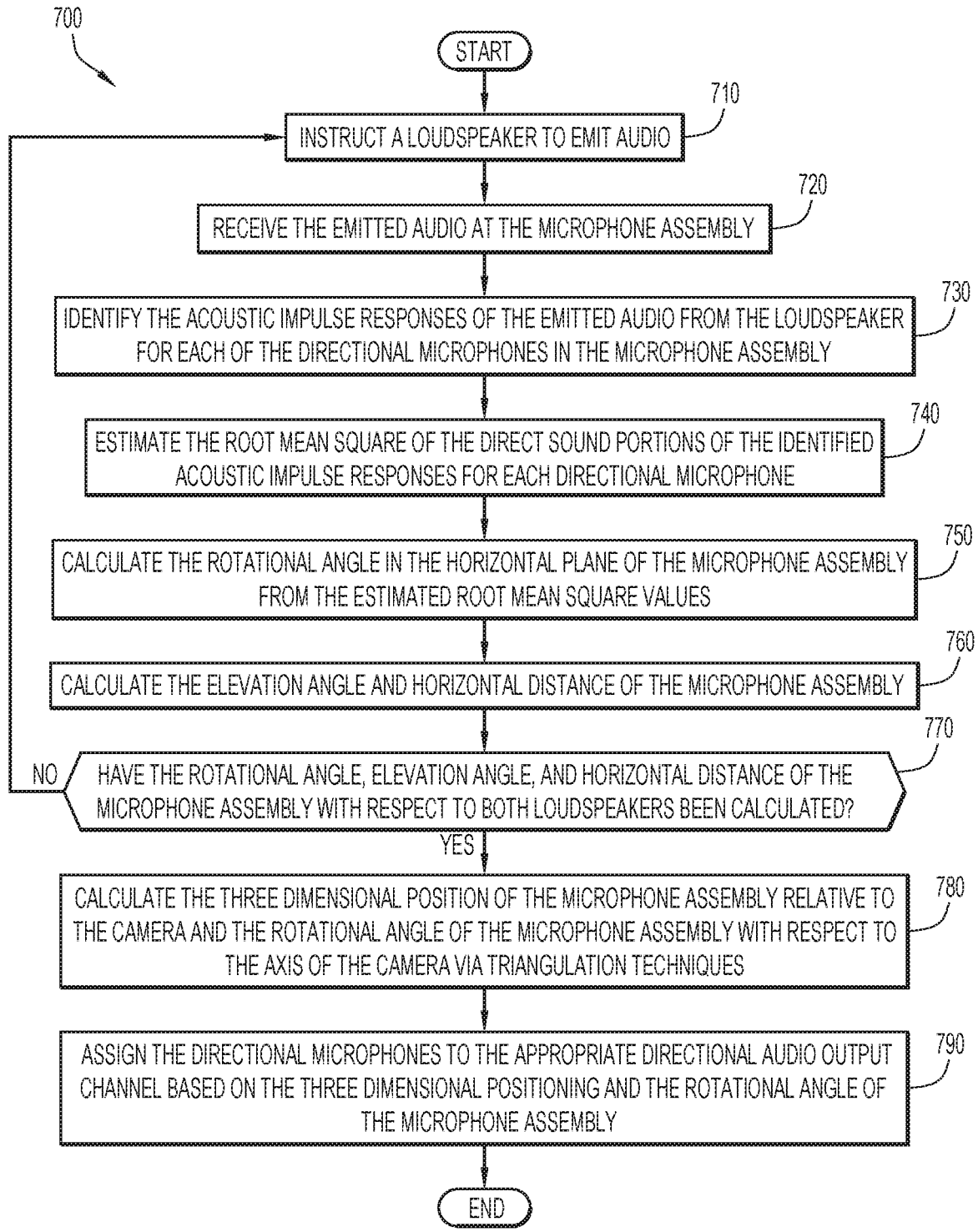
FIG. 7 is a flowchart of a method for determining the spatial location and orientation of the directional microphone assembly with respect to various components of a video conference endpoint, according to an example embodiment.

Turning to FIG. 7, and with continued reference to FIGS. 3A-3C, 4, 5A, 5B, and 6A-6C, illustrated is a flowchart of the method 700 performed by the video conference endpoint 104 to determine the spatial coordinates ($x_c$, $y_c$, $z_c$) of the microphone assembly 120 with respect to the camera 112 of the video conference endpoint 104 and the rotation angle $\delta_c$ of the microphone assembly 120 with respect to the axis of the camera 112. The method 700 may be performed during setup or configuration of the video conference endpoint 104 and at least one microphone assembly 120 (i.e., prior to participating in a collaboration session), or may be performed during an active collaboration session to verify and/or correct the spatial relationship of at least one microphone assembly 120 with respect to the axis of the camera 112 of the video conference endpoint 104. Moreover, the method 700 may be performed such that the spatial relationship of a microphone assembly 120 with respect to the axis of the camera 112 of the video conference endpoint 104 is automatically detected and configured (i.e., when a microphone assembly 120 is moved to a different location on a conference table 202 before or during a collaboration session). With the spatial coordinates ($x_c$, $y_c$, $z_c$) and rotational angle $\delta_c$ of the microphone assembly 120 with respect to the axis of the camera 112 determined, the video conference endpoint 104 may route the output of the microphone assembly 120, which can have multiple output signals/channels, to the appropriate directional audio output channels. At 710, the video conference endpoint 104 causes one of the loudspeakers 116(1), 116(2) to emit an audio output. This audio output may be an audible full spectrum signal, may be an inaudible ultrasound signal, or may be the audio content from an active collaboration session. Impulse response measurement or estimation is well known to those of ordinary skill in the art, and various signals and calculation methods may be used. While an audible full spectrum signal may be sufficient for initial installation/setup/configuration of the video conference endpoint 104 and the microphone assembly 120, an audible full spectrum signal may be disturbing to participants for configuration while the video conference endpoint 104 is in use (i.e., during an active collaboration session with another video conference endpoint 104). The ultrasound signal may be best suited for configuration/verification of the spatial relationship of the microphone assembly 120 when the video conference endpoint 104 is actively participating in a collaboration session. It may also be possible to configure/verify the spatial relationship of the microphone assembly 120 when the video conference endpoint 104 is actively participating in a collaboration session by using the loudspeaker signals received by the near end video conference endpoint from a far end video conference endpoint (i.e., the conference audio from the collaboration session).

At 720, the microphone assembly 120 receives the audio emitted from one of the loudspeakers 116(1), 116(2) in 710. At 730, the video conference endpoint 104 identifies (i.e., measures, estimates, etc.) the acoustic impulse responses of the emitted audio from one of the loudspeakers 116(1), 116(2) for each of the directional microphones 310(1)-310(4) of the microphone assembly 120. As explained previously with regard to FIG. 5B, because of the orientation of the directional microphones 310(1)-310(4) of the microphone assembly 120 with respect to one another, and because the directional microphones 310(1)-310(4) have known polar patterns 330(1)-330(4), respectively, the acoustic impulse responses 530(1)-530(4) of the directional microphones 310(1)-310(4) differ from one another (i.e., have varying amplitudes, etc.). At 740, the video conference endpoint 104 then estimates or calculates the RMS values for each directional microphone 310(1)-310(4) of the microphone assembly 120 based on the identified direct sound portions of the acoustic impulse responses 530(1)-530(4), as previously explained with regard to FIGS. 5A and 5B. The determination/calculation of the RMS values may account for table reflection (i.e., the reflection of the emitted audio off of the table 202 of the conference room 200 before being received by a directional microphone 310(1)-310(4)). In some embodiments, in order to calculate accurate RMS values, the video conference endpoint 104 may apply bandpass filtering to the directional microphone signals to ensure that the directional microphones adhere to their polar patterns.

At 750, the video conference endpoint 104 calculates the rotational angle in the horizontal plane of the microphone assembly 120 with respect to the loudspeaker 116(1), 116(2) that emitted the audio at 710. As previously explained with regard to FIG. 6A, once the RMS values have been determined for each of the directional microphones 310(1)-310(4) of the microphone assembly 120, the rotational angle $\varphi$ of the microphone assembly 120 within the horizontal plane (i.e., the x-y plane) and with respect to the loudspeaker 116(1), 116(2) that emitted the audio may be determined.

At 760, the video conference endpoint 104 then calculates the elevation angle $\theta$ and horizontal distance r of the microphone assembly 120 with respect to the loudspeaker 116(1), 116(2) that emitted the audio at 710. As previously explained with regard to FIG. 6B, the video conference endpoint 104 may use acoustic propagation delay techniques, or time-of-flight techniques, to determine the time $\Delta t$ it takes for the audio emitted from the loudspeaker 116(1), 116(2) to be received by the microphone assembly 120 so long as the latency of the codec audio output and microphone assembly 120 input is known and controlled by the video conference endpoint 104. The video conference endpoint 104 may also use an assumed table height, an estimated table height (provided by an operator of the video conference endpoint 104), a measured table height (provided by an operator of the video conference endpoint 104) to calculate the height $z_h$ of the loudspeaker 116(1), 116(2) above the table 202, and thus, the height above the microphone assembly 120. In other embodiments, the elevation angle $\theta$ may be directly calculated from RMS values. With the time $\Delta t$ and the height $z_h$ known, the video conference endpoint 104 may then determine the horizontal distance r between the microphone assembly 120 and the loudspeaker 116(1), 116(2) that emitted the audio at 710, and the elevation angle $\theta$ between the microphone assembly 120 and the loudspeaker 116(1), 116(2) that emitted the audio at 710.

At 770, the video conference endpoint 104 may determine whether the rotational angle $\varphi$, the elevation angle $\theta$, and the horizontal distance r of the microphone assembly 120 with respect to both loudspeakers 116(1), 116(2) of the video conference endpoint 104 are known. If the rotational angle $\varphi$, the elevation angle $\theta$, and the horizontal distance r of the microphone assembly 120 with respect to only one loudspeaker 116(1), 116(2) of the video conference endpoint 104 are known, then the video conference endpoint 104 returns to steps 710-760 to calculate the rotational angle $\varphi$, the elevation angle $\theta$, and the horizontal distance r of the microphone assembly 120 with respect to the other loudspeaker 116(1), 116(2). If, however, the rotational angle $\varphi$, the elevation angle $\theta$, and the horizontal distance r of the microphone assembly 120 with respect to both loudspeakers 116(1), 116(2) of the video conference endpoint 104 are known, then, at 780, the video conference endpoint 104 may calculate the three dimensional positioning of the microphone assembly 120 with respect to the camera 112. As previously explained with regard to FIG. 6C, the video conference endpoint 104 may use known triangulation techniques to determine the spatial coordinates ($x_c$, $y_c$, $z_c$) of the microphone assembly 120 with respect to the camera 112. More specifically, the video conference endpoint 104 may utilize rotational angles $\varphi$, $\varphi_c$, elevation angles $\theta$, $\theta_c$, horizontal distances r, $r_c$, and the predetermined spatial relationship between the loudspeakers 116(1), 116(2) and the camera 112 to determine the spatial coordinates ($x_c$, $y_c$, $z_c$) of the microphone assembly 120 with respect to the camera 112. The video conference endpoint 104 may also calculate, at 780, the rotational angle $\delta_c$ of the microphone assembly 120 with respect to the axis of the camera 112 from the rotational angles $\varphi$, $\varphi_c$, elevation angles $\theta$, $\theta_c$, horizontal distances r, $r_c$, and the predetermined spatial relationship between the loudspeakers 116(1), 116(2) and the camera 112.

At 790, with the knowledge of the spatial coordinates ($x_c$, $y_c$, $z_c$) and the rotational angle $\delta_c$ of the microphone assembly 120 with respect to the axis of the camera 112, the video conference endpoint 104 can assign, route or mix the outputs of each of the directional microphones 310(1)-310(4) to the appropriate directional audio output channel (i.e., the left channel or the right channel) of the video conference endpoint 104 so that the audio outputs of the video conference endpoint 104 spatially match what is shown in the video output of the video conference endpoint 104.

Figure 8A:
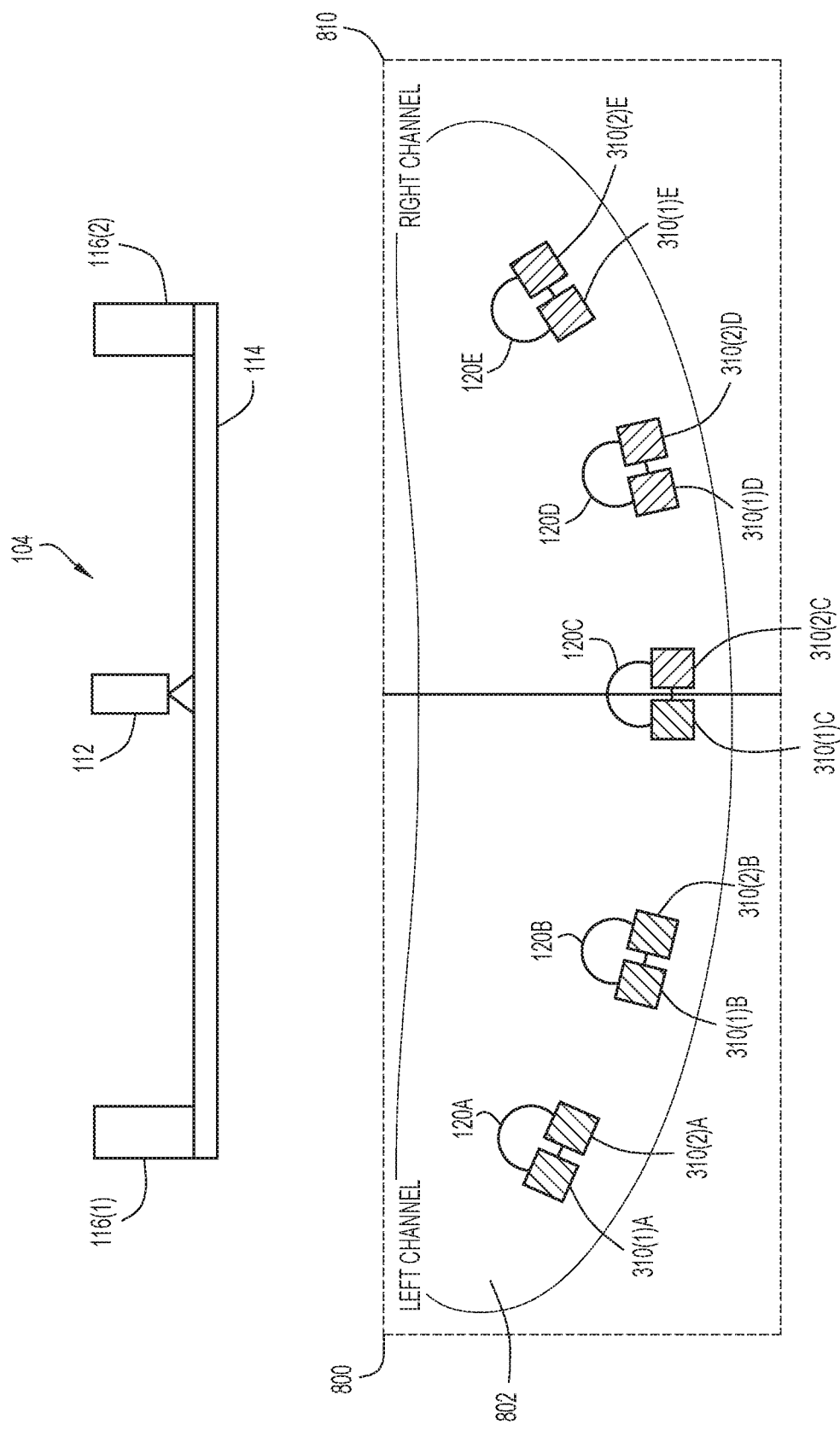

Turning to FIGS. 8A-8C, illustrated are schematic views of a video conference endpoint 104 disposed in proximity to various different conference tables 202, where a plurality of microphone assemblies 120 are disposed on the various conference tables 202 in different layouts/positions. The video conference endpoint 104 assigns various directional microphones to appropriate directional audio output channels of the video conference endpoint 104 based on the spatial relationship of the microphone assemblies with respect to the camera of the video conference endpoint 104. The embodiment of the video conference endpoint 104 illustrated in FIGS. 8A-8C may include camera 112, display device 114, and loudspeakers 116(1), 116(2), where the camera 112, display device 114, and loudspeakers 116(1), 116(2) have a predetermined positional/spatial relationship to one another. As illustrated in FIG. 8A, the conference table 802 in view of the camera 112 is a wide conference table with five microphone assemblies 120A-120E positioned across the width of the conference table 802. Using the techniques described above with regard to FIGS. 5A, 5B, 6A-6C, and 7, the video conference endpoint 104 may determine the spatial relationship (i.e., spatial coordinates ($x_c$, $y_c$, $z_c$) and rotational angle $\delta_c$) of each of the microphone assemblies 120A-120E with respect to the camera 112. In other words, the video conference endpoint 104 may perform the method 700 illustrated in FIG. 7 for each of the microphone assemblies 120A-120E to determine the spatial relationship of each of the microphone assemblies 120A-120E with respect to the camera 112. Once completed, for the arrangement illustrated in FIG. 8A, the video conference endpoint 104 may assign the first and second directional microphones 310(1)A, 310(2)A of the first microphone assembly 120A, the first and second directional microphones 310(1)B, 310(2)B of the second microphone assembly 120B, and the first directional microphone 310(1)C of the third microphone assembly 120C to the first, or left, directional audio output channel 800. The video conference endpoint 104 may further assign the second directional microphone 310(2)C of the third microphone assembly 120C, the first and second directional microphones 310(1)D, 310(2)D of the fourth microphone assembly 120D, and the first and second directional microphones 310(1)E, 310(2)E of the fifth microphone assembly 120E to the second, or right, directional audio output channel 810. The assignments may be based on the spatial relationships of the microphone assemblies 120A-120E with respect to the camera 112 as determined by the video conference endpoint 104. For the example of FIG. 8A, it may be assumed that the microphone assemblies 120A-120E each have a rotational angle that positions or orients the first and second directional microphones 310(1)A, 310(2)A, 310(1)B, 310(2)B, 310(1)C, 310(2)C, 310(1)D, 310(2)D, 310(1)E, 310(2)E away from the video conference endpoint 104 (i.e., towards participants sitting at table 802). It should be noted that the microphone assemblies 120A-120E may have any rotational angle such that any directional microphone(s) of the microphone assemblies 120A-120E are oriented away from the video conference endpoint 104. With the microphone assemblies 120A-120E and their associated directional microphones being assigned to specific directional audio output channels 800, 810, the video conference endpoint 104 may be configured to output audio received by the microphone assemblies 120A-120E to the appropriate channel 800, 810 such that the audio output matches what is shown in the video output of the camera 112.

As illustrated in FIG. 8B, the conference table 804 in view of the camera 112 is a long conference table that extends away from the video conference endpoint 104, where two microphone assemblies 120A, 120B are positioned along the conference table 804. Using the techniques described above with regard to FIGS. 5A, 5B, 6A-6C, and 7, the video conference endpoint 104 may determine the spatial relationship (i.e., spatial coordinates ($x_c$, $y_c$, $z_c$) and rotational angle $\varphi_c$) of each of the microphone assemblies 120A, 120B with respect to the camera 112. In other words, the video conference endpoint 104 may perform the method 700 illustrated in FIG. 7 for each of the microphone assemblies 120A, 120B to determine the spatial relationship of each of the microphone assemblies 120A, 120B with respect to the camera 112. Once completed, for the arrangement illustrated in FIG. 8B, the video conference endpoint 104 may assign the first and second directional microphones 310(1)A, 310(2)A of the first microphone assembly 120A, and the first and second directional microphones 310(1)B, 310(2)B of the second microphone assembly 120B to the first, or left, directional audio output channel 820. The video conference endpoint 104 may further assign the third and fourth directional microphones 310(3)A, 310(4)A of the first microphone assembly 120A, and the third and fourth directional microphones 310(3)B, 310(4)B of the second microphone assembly 120B to the second, or right, directional audio output channel 830. For the example of FIG. 8B, it may be assumed that the microphone assemblies 120A, 120B each have a rotational angle that orients the first and second directional microphones 310(1)A, 310(2)A, 310(1)B, 310(2)B toward the left side of the table 804, and orients the third and fourth directional microphones 310(3)A, 310(4)A, 310(3)B, 310(4)B toward the right side of the table 804. It should be noted that the microphone assemblies 120A, 120B may have any rotational angle.

As illustrated in FIG. 8C, the conference table 806 in view of the camera 112 is another long conference table that extends away from the video conference endpoint 104, where the conference table 806 of FIG. 8C may be longer and wider than the conference table 804 of FIG. 8B. Disposed on the conference table 806 illustrated in FIG. 8C are six microphone assemblies 120A-120F. Using the techniques described above with regard to FIGS. 5A, 5B, 6A-6C, and 7, the video conference endpoint 104 may determine the spatial relationship (i.e., spatial coordinates ($x_c$, $y_c$, $z_c$) and rotational angle $\varphi_c$) of each of the microphone assemblies 120A-120F with respect to the camera 112. In other words, the video conference endpoint 104 may perform the method 700 illustrated in FIG. 7 for each of the microphone assemblies 120A-120F to determine the spatial relationship of each of the microphone assemblies 120A-120F with respect to the camera 112. Once completed, for the arrangement illustrated in FIG. 8C, the video conference endpoint 104 may assign the first and second directional microphones 310(1)A, 310(2)A of the first microphone assembly 120A, the first and second directional microphones 310(1)C, 310(2)C of the third microphone assembly 120C, the first and second directional microphones 310(1)E, 310(2)E of the fifth microphone assembly 120E, and the first and second directional microphones 310(1)F, 310(2)F of the sixth microphone assembly 120F to the first, or left, directional audio output channel 840. The video conference endpoint 104 may further assign the third and fourth directional microphones 310(3)B, 310(4)B of the second microphone assembly 120B, the third and fourth directional microphones 310(3)D, 310(4)D of the fourth microphone assembly 120D, the third and fourth directional microphones 310(3)E, 310(4)E of the fifth microphone assembly 120E, and the third and fourth directional microphones 310(3)F, 310(4)F of the sixth microphone assembly 120F to the second, or right, directional audio output channel 850. For the example of FIG. 8C, it may be assumed that the microphone assemblies 120A-120F each have a rotational angle that orients their respective first and second directional microphones toward the left side of the table 806, and orients their respective third and fourth directional microphones toward the right side of the table 806. It should be noted that the microphone assemblies 120A-120F may have any rotational angle.

With regard to FIGS. 8A, 8B, and 8C, the first and second directional audio output channels need to be swapped before transmission to a far end video conference endpoint since the left side of the tables 802, 804, 806 in proximity to the near end video conference endpoints will be seen on the right side of the video display of the far end video conference endpoint, and vice versa.

Turning to FIGS. 9A and 9B, and with continued reference to FIGS. 3A-3C, illustrated are additional embodiments of a microphone assembly 120. As illustrated in FIG. 9A, the microphone assembly 120 may include a display screen or touch screen 900 that is integrated into the cover 320 of the microphone assembly 120. The screen 900 may be used to confirm the automated detection of the microphone assembly 120 by a video conference endpoint 104 and/or may indicate the rotational angle (pc of the microphone assembly 120 that is calculated/detected by a video conference endpoint 104. In the illustrated embodiment of FIG. 9A, the screen 900 may display a series of arrows 910(1)-910(4) that may be aligned with the directions of the directional microphones 310(1)-310(4), respectively, disposed within the microphone assembly 120, and may indicate which of the directional microphones 310(1)-310(4) are oriented toward the camera 112. As illustrated in FIG. 9A, the screen 900 may display an indication that the first arrow 910(1), and thus, the first directional microphone 310(1), may be oriented toward a camera 112 of a video conference endpoint 104. If the screen 900 is a touch screen, the screen 900 may further enable a user/operator to manually setup or correct the orientation of the microphone assembly 120.

Illustrated in FIG. 9B is another embodiment of a microphone assembly 120, where the microphone assembly 120 includes a series of light emitting diodes (LEDs) 920. While the embodiment of the microphone assembly 120 illustrated in FIG. 9B includes twelve (12) LEDs 920, the microphone assembly 120 may include any number of LEDs (e.g., a circle of LEDs, an array of LEDs, etc.). Like the screen 900 of the embodiment of FIG. 9A, the LEDs 920 may be used to confirm the automated detection of the microphone assembly 120 by a video conference endpoint 104 and/or may indicate the rotational angle (pc of the microphone assembly 120 calculated/detected by a video conference endpoint 104. In some embodiments, the LEDs 920 may indicate which of the directional microphones 310(1)-310(4) of the microphone assembly 120 are oriented toward a camera 112 of a video conference endpoint. In even further embodiments, the LEDs 920, which may include multiple colored LEDs, can indicate the configured routing of the directional microphone output audio streams (i.e., which directional microphone output audio streams are assigned to the first directional audio output channel and which are assigned to the second directional audio output channel).

Thus, as illustrated in FIGS. 9A and 9B, the microphone assembly 120 may be equipped with a display device (e.g., screen, touch screen, LEDs) that may serve to indicate the orientation of the microphone assembly.

Figure 10:
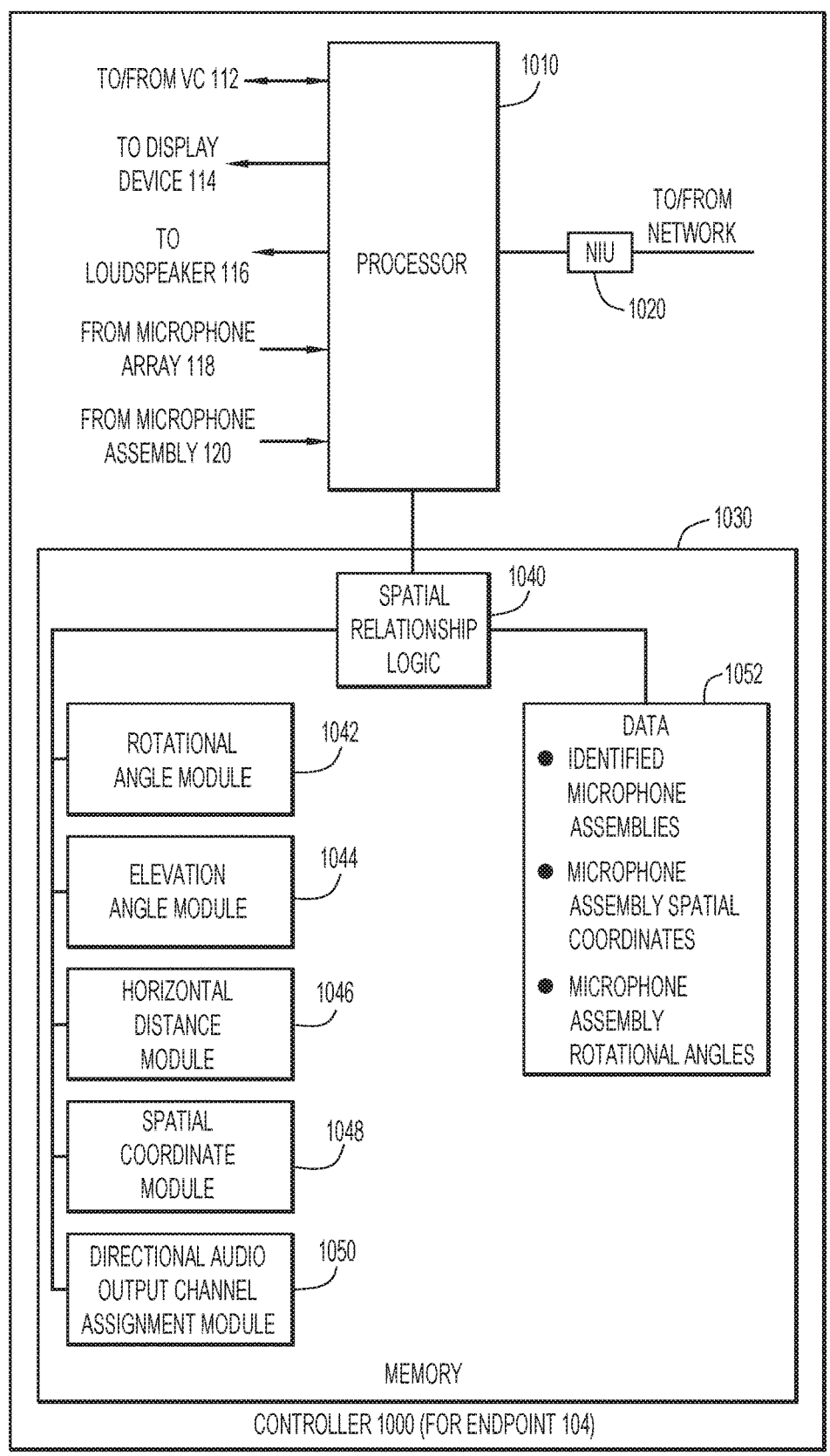
FIG. 10 is a block diagram of a controller for a video conference endpoint configured to perform techniques described herein, according to an embodiment.

Reference is now made to FIG. 10, which shows an example block diagram of a controller 1000 of the video conference endpoint 104 configured to perform the techniques for determining the spatial relationship of the microphone assembly 120 with respect to the camera of the video conference endpoint 104 according to embodiments described herein. There are numerous possible configurations for controller 1000 and FIG. 10 is meant to be an example. Controller 1000 includes a processor 1010, a network interface unit 1020, and memory 1030. The network interface (I/F) unit (NIU) 1020 is, for example, an Ethernet card or other interface device that allows the controller 1000 to communicate over communication network 110. Network I/F unit 1020 may include wired and/or wireless connection capability.

Processor 1010 may include a collection of microcontrollers and/or microprocessors, for example, each configured to execute respective software instructions stored in the memory 1030. The collection of microcontrollers may include, for example: a video controller to receive, send, and process video signals related to video cameras 112(1)-112(N) and display devices 114(1)-114(N); an audio processor to receive, send, and process audio signals related to loudspeakers 116(1)-116(N), microphone arrays 118(1)-118(N), and microphone assemblies 120A-120N, where N represents any number; and a high-level controller to provide overall control. Processor 1010 may send pan, tilt, and zoom commands to the video cameras 112(1)-112(N), which is responsive to the commands as would be appreciated by one of ordinary skill in the relevant arts. Portions of memory 1030 (and the instruction therein) may be integrated with processor 1010. In the transmit direction, processor 1010 encodes audio/video captured by video cameras 112(1)-112(N), microphone arrays 118(1)-118(N), and microphone assemblies 120A-120N, encodes the captured audio/video into data packets, encodes the indication of the active content into packets, and causes the encoded data packets to be transmitted to communication network 110. In a receive direction, processor 1010 decodes audio/video from data packets received from communication network 110 and causes the audio/video to be presented to local participants via display devices 114(1)-114(N) and loudspeakers 116(1)-116(N).

The memory 1030 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1030 may comprise one or more computer readable storage media (e.g., a memory device) encoded with software comprising computer executable instructions and when the software is executed (by the processor 1010) it is operable to perform the operations described herein. For example, the memory 1030 stores or is encoded with instructions for spatial relationship logic 1040 to calculate/determine the spatial relationship of the microphone assemblies 120A-120N with respect to the cameras 112(1)-112(N) of the video conference endpoint 104 and assigning/routing various channels of each microphone assembly 120A-120N to a specific directional audio output channel of the video conference endpoint 104. Spatial relationship logic 1040 includes a rotational angle module 1042 configured to determine/calculate the rotational angles of the microphone assemblies 120A-120N with respect to components of the video conference endpoint 104, an elevation angle module 1044 configured to determine/calculate the elevation angles of the microphone assemblies 120A-120N with respect to components of the video conference endpoint 104, a horizontal distance module 1046 configured to determine/calculate the horizontal distance of the microphone assemblies 120A-120N from the components of the video conference endpoint 104, a spatial coordinate module 1048 configured to determine/calculate the spatial coordinates of the microphone assemblies 120A-120N with respect to components of the video conference endpoint 104, and a directional audio output channel assignment module 1050 configured to assign the outputs of the microphone assemblies 120A-120N to the a proper audio output channel of the video conference endpoint 104.

In addition, memory 1030 stores data 1052 used and generated by logic/modules 1040-1050, including, but not limited to: information associated with detected/identified microphone assemblies 120A-120N; microphone assembly rotational angles; microphone assembly elevation angles; microphone assembly spatial coordinates; and assignments of the channels of the microphone assemblies to specific directional audio output channels; etc.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) and/or storage can store data, software, code, instructions (e.g., processor instructions), logic, parameters, combinations thereof, and/or the like used for operations described herein. This includes memory element(s) and/or storage being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 11:
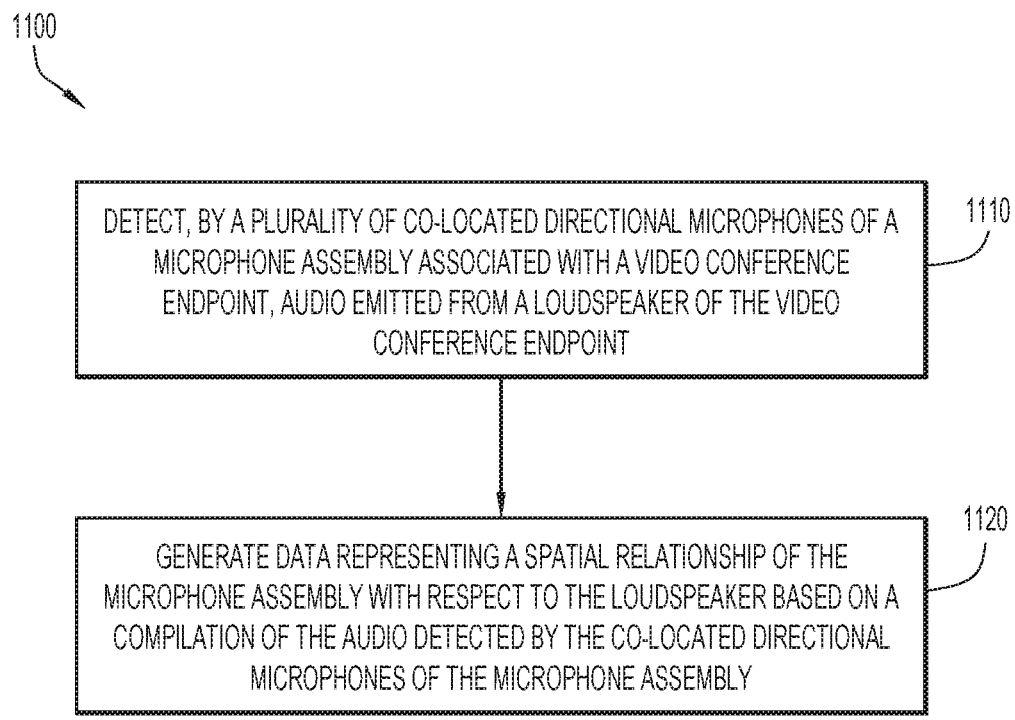
FIG. 11 is a flowchart of a method of generating data representing the spatial relationship of the components of the video conference endpoint, according to an example embodiment.

With reference to FIG. 11, illustrated is a flowchart of a method 1100 performed by the video conference endpoint 104 to determine or calculate the spatial relationship of a microphone assembly with respect to the loudspeaker of the video conference endpoint 104. Reference is also made to FIGS. 2, 3A-3C, 4, 5A, 5B, 6A-6C, 7, and 8A-8C for purposes of the description of FIG. 11. At 1110, the video conference endpoint 104 detects, by a microphone assembly 120 associated with the video conference endpoint, the audio emitted from a loudspeaker 116. The microphone assembly 120 may include a plurality of co-located directional microphones 310(1)-310(4), and each of the directional microphones is configured to detect and transduce, to some degree, the audio emitted by the loudspeaker 116. Thus, the video conference endpoint 104 enables the directional microphones 310(1)-310(4) of the microphone assembly 120 to detect and transduce the audio that is played, generated, or emitted from a loudspeaker 116 of the video conference endpoint 104 located within a conference room 200. At 1120, video conference endpoint 104 may generate data representing a spatial relationship of the microphone assembly 120 with respect to the loudspeaker 116 by utilizing a compilation of the audio detected by each of the co-located directional microphones. In other words, and as previously explained in regard to FIGS. 5B and 6A, the video conference endpoint 104 may calculate the RMS values for each of the acoustic impulse responses 530(1)-530(4) of the directional microphones 310(1)-310(4), which is then used to determine the rotational angle φ of the microphone assembly 120 with respect to the loudspeaker 116. As explained above with regard to FIG. 6B, the video conference endpoint 104 may use the emitted audio and acoustic propagation delay techniques to determine the horizontal distance and elevation angle of the microphone assembly 120 with respect to the loudspeaker 116. As previously explained with regard to FIG. 6C, with the loudspeaker 116 and the camera 112 of the video conference endpoint 104 having a predetermined positional/spatial relationship to one another, the video conference endpoint 104 may use triangulation techniques to determine the spatial coordinates and rotational angle of the microphone assembly 120 with respect to the camera 112 of the video conference endpoint.

In other embodiments, instead of, at 1120, the video conference endpoint 104 generating the spatial relationship of the microphone assembly 120 with respect to the loudspeaker 116, the microphone assembly 120 may perform the impulse response extraction, RMS calculations, and spatial relationship (the spatial coordinates ($x_c$, $y_c$, $z_c$) and the rotational angle $\delta c$ of the microphone assembly 120 with respect to the axis of the camera 112) calculations. The microphone assembly 120 may then relay the spatial relationship data to the video conference endpoint 104. Thus, data may be exchanged between the microphone assembly 120 and the video conference endpoint 104 in both directions (i.e., via an Ethernet cable that carries both audio streams and data).

The co-located directional microphones 310(1)-310(4) of the microphone assembly 120 may be arranged in a known positional/spatial relationship to one another (i.e., a known orientation with respect to one another), and may each have a cardioid polar pattern 330(1)-330(4).

Techniques presented herein automatically determine/calculate the spatial relationship of a microphone assembly disposed on a conference table or other surface within a conference room with respect to the camera of the video conference endpoint within the conference room. The techniques presented herein may be used to setup/configure the video conference endpoint and microphone assembly so that the video conference endpoint can assign various channels or directional microphones of the microphone assembly to the proper directional audio output channel based on the positioning of the microphone assembly with respect to the camera of the video conference endpoint. During setup of the video conference endpoint in a conference room, the microphone assemblies may be placed upon a surface in the conference room and connected to the video conference endpoint. Regardless of where the microphone assemblies are placed, the video conference endpoint may automatically determine the spatial relationship of the microphone assemblies with respect to the camera of the video conference endpoint. Moreover, as the microphone assemblies are moved to different positions, the video conference endpoint may be capable of automatically detecting the location changes, and provide information that enables the video conference endpoint to update the spatial relationship between the microphone assemblies and the camera of the video conference endpoint. Thus, in addition to setting up the video conference endpoint, the techniques presented herein may be used during an active collaboration session to automatically verify or correct the positions of the microphone assemblies.

With the spatial relationship of the microphone assemblies with respect to the video conference endpoint being known, the video conference endpoint may be map/route/assign the audio captured by the directional microphones of the microphone assemblies to an appropriate outgoing audio channel that matches the video layout of the camera of the video conference endpoint. The determination of the spatial relationship of the microphone assemblies may be performed by the video conference endpoint through audio processing, and without any video or visual processing (i.e., without video output from the camera). The video conference endpoint may further be able utilize the techniques described herein to determine the rotational angle, elevation angle, and horizontal distance between the microphone assemblies and an active speaking participant within the conference room to allow the video conference endpoint to speaker track the active speakers during a collaboration session. With the spatial relationship of the microphone assemblies known with respect to various components of the video conference endpoint (i.e., cameras, loudspeakers, display devices, etc.), the video conference endpoint may be able to track active speakers with a faster response time and higher angular resolution than conventional speaker tracking methods.

In summary, in one form, a method is provided comprising: at a video conference endpoint having a microphone assembly coupled thereto and a loudspeaker, the microphone assembly including a plurality of co-located directional microphones: detecting, by the plurality of co-located directional microphones of the microphone assembly, audio emitted from the loudspeaker of the video conference endpoint; and generating data representing a spatial relationship of the microphone assembly with respect to the loudspeaker based on a compilation of the audio detected by the co-located directional microphones of the microphone assembly.

In another form, an apparatus is provided comprising: a loudspeaker configured to emit audio; a microphone assembly including a plurality of co-located directional microphones; and a processor configured to: detect, by the plurality of co-located directional microphones of the microphone assembly, audio emitted from the loudspeaker; and generate data representing a spatial relationship of the microphone assembly with respect to the loudspeaker based on a compilation of the audio detected by the co-located directional microphones of the microphone assembly.

In yet another form, a (non-transitory) processor readable medium is provided. The medium stores instructions that, when executed by a processor, cause the processor to: detect, by a plurality of co-located directional microphones of a microphone assembly associated with a video conference endpoint, audio emitted from a loudspeaker of the video conference endpoint; and generate data representing a spatial relationship of the microphone assembly with respect to the loudspeaker based on a compilation of the audio detected by the co-located directional microphones of the microphone assembly.

The above description is intended by way of example only. Various modifications and structural changes may be made therein without departing from the scope of the concepts described herein and within the scope and range of equivalents of the claims.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a video conference endpoint having a microphone assembly coupled thereto and a loudspeaker, the microphone assembly including a plurality of co-located directional microphones:
      detecting, by the plurality of co-located directional microphones of the microphone assembly, audio emitted from the loudspeaker of the video conference endpoint; and
      generating data representing a spatial relationship of the microphone assembly with respect to the loudspeaker based on a compilation of the audio detected by the co-located directional microphones of the microphone assembly, the data representing the spatial relationship including a rotational angle of the microphone assembly with respect to the loudspeaker of the video conference endpoint and an elevation angle of the microphone assembly with respect to the loudspeaker of the video conference endpoint.

2. The method of claim 1, wherein the plurality of co-located directional microphones of the microphone assembly are arranged in a known physical orientation with respect to each other, and wherein each of the plurality of co-located directional microphones has a known polar pattern.

3. The method of claim 2, wherein detecting, by the plurality of co-located directional microphones of the microphone assembly, audio emitted from the loudspeaker further comprises:
generating, for each of the plurality of co-located directional microphones of the microphone assembly, an acoustic impulse response from the loudspeaker to each of the co-located directional microphones of the microphone assembly, wherein the acoustic impulse responses differ from each other due to the physical orientation of each of the plurality of co-located directional microphones and the known polar pattern of each of the plurality of co-located directional microphones.

4. The method of claim 3, the method further comprising:
determining a value for a direct sound portion of the acoustic impulse responses from the loudspeaker to each of the co-located directional microphones of the microphone assembly.

5. The method of claim 4, wherein the rotational angle of the microphone assembly with respect to the loudspeaker of the video conference endpoint is calculated from the value of the direct sound portion of the acoustic impulse response of each of the co-located directional microphones of the microphone assembly, and wherein the elevation angle of the microphone assembly with respect to the loudspeaker of the video conference endpoint is calculated from an acoustic propagation delay with respect to the audio detected by the plurality of co-located directional microphones of the microphone assembly.

6. The method of claim 5, wherein the loudspeaker is a first loudspeaker, the acoustic impulse response is a first acoustic impulse response, the value is a first value, the rotational angle is a first rotational angle, the elevation angle is a first elevation angle, and the acoustic propagation delay is a first acoustic propagation delay, the method further comprising:
generating, for each of the plurality of co-located directional microphones of the microphone assembly, a second acoustic impulse response of audio emitted from a second loudspeaker and detected by each of the co-located directional microphones of the microphone assembly;
determining a second value for a direct sound portion of the second acoustic impulse response of each of the co-located directional microphones of the microphone assembly;
calculating a second rotational angle of the microphone assembly with respect to the second loudspeaker of the video conference endpoint based on the second value of the direct sound portion of the second acoustic impulse response of each of the co-located directional microphones of the microphone assembly;
calculating a second elevation angle of the microphone assembly with respect to the second loudspeaker of the video conference endpoint based on a second acoustic propagation delay with respect to the audio emitted from the second loudspeaker and detected by the plurality of co-located directional microphones of the microphone assembly; and
calculating a three-dimensional position of the microphone assembly with respect to a camera of the video conference endpoint using triangulation techniques and based on the first rotational angle of the microphone assembly with respect to the first loudspeaker, the first elevation angle of the microphone assembly with respect to the first loudspeaker, the second rotational angle of the microphone assembly with respect to the second loudspeaker, and the second elevation angle of the microphone assembly with respect to the second loudspeaker, wherein the first loudspeaker and the second loudspeaker have predetermined known spatial relationships with the camera.

7. The method of claim 1, wherein the microphone assembly is equipped with one or more display devices configured to indicate a rotational orientation of the microphone assembly.

8. An apparatus comprising:
a loudspeaker configured to emit audio;
a microphone assembly including a plurality of co-located directional microphones; and
a processor configured to:
detect, by the plurality of co-located directional microphones of the microphone assembly, audio emitted from the loudspeaker; and
generate data representing a spatial relationship of the microphone assembly with respect to the loudspeaker based on a compilation of the audio detected by the co-located directional microphones of the microphone assembly, the data representing the spatial relationship including a rotational angle of the microphone assembly with respect to the loudspeaker and an elevation angle of the microphone assembly with respect to the loudspeaker.

9. The apparatus of claim 8, wherein the plurality of co-located directional microphones of the microphone assembly are arranged in a known physical orientation with respect to each other, and wherein each of the plurality of co-located directional microphones has a known polar pattern.

10. The apparatus of claim 9, wherein, when directing, by the plurality of co-located directional microphones of the microphone assembly audio emitted from the loudspeaker, the processor is further configured to:
generate, for each of the plurality of co-located directional microphones of the microphone assembly, an acoustic impulse response from the loudspeaker to each of the co-located directional microphones of the microphone assembly, wherein the acoustic impulse responses differ from each other due to the physical orientation of each of the plurality of co-located directional microphones and the known polar pattern of each of the plurality of co-located directional microphones.

11. The apparatus of claim 10, wherein the processor is further configured to:
determine value for a direct sound portion of each of the acoustic impulse responses from the loudspeaker to each of the co-located directional microphones of the microphone assembly.

12. The apparatus of claim 11, wherein the rotational angle of the microphone assembly with respect to the loudspeaker is calculated from the value of the direct sound portion of the acoustic impulse response of each of the co-located directional microphones of the microphone assembly, and wherein the elevation angle of the microphone assembly with respect to the loudspeaker is calculated from an acoustic propagation delay with respect to the audio detected by the plurality of co-located directional microphones of the microphone assembly.

13. The apparatus of claim 12, wherein the loudspeaker is a first loudspeaker, the acoustic impulse response is a first acoustic impulse response, the value is a first value, the rotational angle is a first rotational angle, the elevation angle is a first elevation angle, and the acoustic propagation delay is a first acoustic propagation delay wherein the apparatus further includes a second loudspeaker and a camera, and wherein the processor is further configured to:
    generate, for each of the plurality of co-located directional microphones of the microphone assembly, a second acoustic impulse response of audio emitted from the second loudspeaker and detected by each of the co-located directional microphones of the microphone assembly;
    determine a second value for a direct sound portion of the second acoustic impulse response of each of the co-located directional microphones of the microphone assembly;
    calculate a second rotational angle of the microphone assembly with respect to the second loudspeaker based on the second value of the direct sound portion of the second acoustic impulse response of each of the co-located directional microphones of the microphone assembly;
    calculate a second elevation angle of the microphone assembly with respect to the second loudspeaker based on a second acoustic propagation delay with respect to the audio emitted from the second loudspeaker and detected by the plurality of co-located directional microphones of the microphone assembly; and
    calculate a three-dimensional position of the microphone assembly with respect to the camera using triangulation techniques and based on the first rotational angle of the microphone assembly with respect to the first loudspeaker, the first elevation angle of the microphone assembly with respect to the first loudspeaker, the second rotational angle of the microphone assembly with respect to the second loudspeaker, and the second elevation angle of the microphone assembly with respect to the second loudspeaker, wherein the first loudspeaker and the second loudspeaker have predetermined known spatial relationships with the camera.

14. The apparatus of claim 8, wherein the microphone assembly is equipped with one or more display devices configured to indicate a rotational orientation of the microphone assembly.

15. One or more non-transitory computer readable storage media encoded with instructions that, when executed by a processor, cause the processor to:
    detect, by a plurality of co-located directional microphones of a microphone assembly associated with a video conference endpoint, audio emitted from a loudspeaker of the video conference endpoint; and
    generate data representing a spatial relationship of the microphone assembly with respect to the loudspeaker based on a compilation of the audio detected by the co-located directional microphones of the microphone assembly, the data representing the spatial relationship including a rotational angle of the microphone assembly with respect to the loudspeaker of the video conference endpoint and an elevation angle of the microphone assembly with respect to the loudspeaker of the video conference endpoint.

16. The non-transitory computer readable storage media of claim 15, wherein the plurality of co-located directional microphones of the microphone assembly are arranged in a known physical orientation with respect to each other, and wherein each of the plurality of co-located directional microphones has a known polar pattern.

17. The non-transitory computer readable storage media of claim 16, wherein, when directing, by the plurality of co-located directional microphones of the microphone assembly audio emitted from the loudspeaker, the processor is further configured to:
    generate, for each of the plurality of co-located directional microphones of the microphone assembly, an acoustic impulse response from the loudspeaker to each of the co-located directional microphones of the microphone assembly, wherein the acoustic impulse responses differ from each other due to the physical orientation of each of the plurality of co-located directional microphones and the known polar pattern of each of the plurality of co-located directional microphones.

18. The non-transitory computer readable storage media of claim 17, wherein the instructions are further operable to cause the processor to:
    determine a value for a direct sound portion of the acoustic impulse responses from the loudspeaker to each of the co-located directional microphones of the microphone assembly.

19. The non-transitory computer readable storage media of claim 18, wherein the rotational angle of the microphone assembly with respect to the loudspeaker of the video conference endpoint is calculated from the value of the direct sound portion of the acoustic impulse response of each of the co-located directional microphones of the microphone assembly, and wherein the elevation angle of the microphone assembly with respect to the loudspeaker of the video conference endpoint is calculated from an acoustic propagation delay with respect to the audio detected by the plurality of co-located directional microphones of the microphone assembly.

20. The non-transitory computer readable storage media of claim 19, wherein the loudspeaker is a first loudspeaker, the acoustic impulse response is a first acoustic impulse response, the value is a first value, the rotational angle is a first rotational angle, the elevation angle is a first elevation angle, and the acoustic propagation delay is a first acoustic propagation delay, wherein the video conference endpoint further includes a second loudspeaker and a camera, and wherein the instructions are further operable to cause the processor to:
    generate, for each of the plurality of co-located directional microphones of the microphone assembly, a second acoustic impulse response of audio emitted from the second loudspeaker and detected by each of the co-located directional microphones of the microphone assembly;
    determine a second value for a direct sound portion of the second acoustic impulse response of each of the co-located directional microphones of the microphone assembly;
    calculate a second rotational angle of the microphone assembly with respect to the second loudspeaker of the video conference endpoint based on the second value of the direct sound portion of the second acoustic impulse response of each of the co-located directional microphones of the microphone assembly;

calculate a second elevation angle of the microphone assembly with respect to the second loudspeaker of the video conference endpoint based on a second acoustic propagation delay with respect to the audio emitted from the second loudspeaker and detected by the plurality of co-located directional microphones of the microphone assembly; and calculate a three-dimensional position of the microphone assembly with respect to the camera of the video conference endpoint using triangulation techniques and based on the first rotational angle of the microphone assembly with respect to the first loudspeaker, the first elevation angle of the microphone assembly with respect to the first loudspeaker, the second rotational angle of the microphone assembly with respect to the second loudspeaker, and the second elevation angle of the microphone assembly with respect to the second loudspeaker, wherein the first loudspeaker and the second loudspeaker have predetermined known spatial relationships with the camera.

\* \* \* \* \*